US012556834B2

United States Patent
Shiotani et al.

(10) Patent No.: US 12,556,834 B2
(45) Date of Patent: Feb. 17, 2026

(54) SOLID-STATE IMAGING ELEMENT, IMAGING DEVICE, AND METHOD FOR CONTROLLING SOLID-STATE IMAGING ELEMENT

(71) Applicant: SONY SEMICONDUCTOR SOLUTIONS CORPORATION, Kanagawa (JP)

(72) Inventors: Yoshimitsu Shiotani, Kanagawa (JP); Takuya Mikami, Kanagawa (JP); Yukiyasu Tatsuzawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 18/715,194

(22) PCT Filed: Oct. 12, 2022

(86) PCT No.: PCT/JP2022/038089
§ 371 (c)(1),
(2) Date: May 31, 2024

(87) PCT Pub. No.: WO2023/105916
PCT Pub. Date: Jun. 15, 2023

(65) Prior Publication Data
US 2025/0030959 A1  Jan. 23, 2025

(30) Foreign Application Priority Data

Dec. 8, 2021 (JP) .................................. 2021-199280

(51) Int. Cl.
*H04N 25/583* (2023.01)
*H04N 25/46* (2023.01)
*H04N 25/778* (2023.01)

(52) U.S. Cl.
CPC ........... *H04N 25/583* (2023.01); *H04N 25/46* (2023.01); *H04N 25/778* (2023.01)

(58) Field of Classification Search
CPC .... H04N 25/583; H04N 25/46; H04N 25/778; H04N 25/134
See application file for complete search history.

(56) References Cited

U.S. PATENT DOCUMENTS 7,815,120 B2 * 10/2010 Carlson .............. G06K 7/10722
235/462.41
9,554,059 B1 * 1/2017 Lin ....................... H04N 25/589
(Continued)

FOREIGN PATENT DOCUMENTS

JP    2021-013131 A    2/2021
WO   2013/100036 A1    7/2013
(Continued)

OTHER PUBLICATIONS

International Search Report and Written Opinion of PCT Application No. PCT/JP2022/038089, issued on Dec. 27, 2022, 10 pages of ISRWO.

*Primary Examiner* — Mekonnen D Dagnew
(74) *Attorney, Agent, or Firm* — CHIP LAW GROUP

(57) ABSTRACT

To improve image quality in a solid-state imaging element that performs synthesis processing to expand a dynamic range. A drive section causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set. A mode setting section that sets one of the pixel addition ratio mode and the exposure ratio mode on the basis of a predetermined parameter related to an imaging scene.

11 Claims, 29 Drawing Sheets

(56) References Cited

U.S. PATENT DOCUMENTS

2018/0343390 A1* 11/2018 Duran ................... H04N 23/741
2024/0292097 A1* 8/2024 Wang ................... H04N 23/667

FOREIGN PATENT DOCUMENTS

| WO | 2018/012051 A1 | 1/2018 |
| WO | 2020/170565 A1 | 8/2020 |
| WO | 2021/215093 A1 | 10/2021 |

* cited by examiner

FIG. 7

| MODE TYPE | | NUMBER OF EXPOSURES | NUMBER OF PIXELS ADDED | EXPOSURE TIME RATIO |
|---|---|---|---|---|
| NORMAL MODE | | 1 | G: 10 AT MAXIMUM R/B: 8 AT MAXIMUM | — |
| HDR MODE | EXPOSURE RATIO MODE | 2 OR MORE | G: 6-4 R/B:4-4 ETC. | 4:1 ETC. |
| | PIXEL ADDITION RATIO MODE | 1 | G:8-2 R/B:6-2 ETC. | 1:1 |

|   |   |   |   |   |   |   |
|---|---|---|---|---|---|---|
|   | R1 (S) | R2 (S) | Gr1 (L) | Gr2 (L) | Gr3 (M) | Gr4 (M) |
| R3 (L) | R4 (L) | R5 (L) | R6 (L) | Gr5 (S) | Gr6 (S) |   |
|   | R7 (M) | R8 (M) | Gr7 (M) | Gr8 (M) | Gr9 (L) | Gr10 (L) |
| Gb1 (L) | Gb2 (L) | Gb3 (M) | Gb4 (M) | B1 (S) | B2 (S) |   |
|   | Gb5 (S) | Gb6 (S) | B3 (L) | B4 (L) | B5 (L) | B6 (L) |
| Gb7 (M) | Gb8 (M) | Gb9 (L) | Gb10 (L) | B7 (M) | B8 (M) |   |

FIG. 12A

|   |   |   |   |   |   |   |
|---|---|---|---|---|---|---|
|   | R1 (S) | R2 (S) | Gr1 (S) | Gr2 (S) | Gr3 (L) | Gr4 (L) |
| R3 (L) | R4 (L) | R5 (L) | R6 (L) | Gr5 (M) | Gr6 (M) |   |
|   | R7 (M) | R8 (M) | Gr7 (L) | Gr8 (L) | Gr9 (S) | Gr10 (S) |
| Gb1 (S) | Gb2 (S) | Gb3 (L) | Gb4 (L) | B1 (S) | B2 (S) |   |
|   | Gb5 (M) | Gb6 (M) | B3 (L) | B4 (L) | B5 (L) | B6 (L) |
| Gb7 (L) | Gb8 (L) | Gb9 (S) | Gb10 (S) | B7 (M) | B8 (M) |   |

| | R1 (S) | R2 (S) | Gr1 (S) | Gr2 (S) | Gr3 (L) | Gr4 (L) | ... |
|---|---|---|---|---|---|---|---|
| R3 (m) | R4 (m) | R5 (L) | R6 (L) | Gr5 (m) | Gr6 (m) | | |
| | R7 (M) | R8 (M) | Gr7 (L) | Gr8 (L) | Gr9 (M) | Gr10 (M) | |
| Gb1 (S) | Gb2 (S) | Gb3 (L) | Gb4 (L) | B1 (S) | B2 (S) | | |
| | Gb5 (m) | Gb6 (m) | B3 (m) | B4 (m) | B5 (L) | B6 (L) | 350 |
| Gb7 (L) | Gb8 (L) | Gb9 (M) | Gb10 (M) | B7 (M) | B8 (M) | | |

300

|  | R1 (S) | R2 (L) | Gr1 (S) | Gr2 (L) | Gr3 (L) | Gr4 (L) | ... |
|---|---|---|---|---|---|---|---|
| R3 (L) | R4 (L) | R5 (L) | R6 (L) | Gr5 (L) | Gr6 (L) | | |
| | R7 (L) | R8 (S) | Gr7 (L) | Gr8 (L) | Gr9 (L) | Gr10 (S) | |
| Gb1 (S) | Gb2 (L) | Gb3 (L) | Gb4 (L) | B1 (S) | B2 (L) | | |
| | Gb5 (L) | Gb6 (L) | B3 (L) | B4 (L) | B5 (L) | B6 (L) | |
| Gb7 (L) | Gb8 (L) | Gb9 (L) | Gb10 (S) | B7 (L) | B8 (S) | | |

300 (top right), 350 (right side)

FIG. 15A

|  | R1 (S) | R2 (L) | Gr1 (L) | Gr2 (S) | Gr3 (L) | Gr4 (L) | ... |
|---|---|---|---|---|---|---|---|
| R3 (L) | R4 (L) | R5 (L) | R6 (L) | Gr5 (L) | Gr6 (L) | | |
| | R7 (L) | R8 (S) | Gr7 (L) | Gr8 (L) | Gr9 (S) | Gr10 (L) | |
| Gb1 (L) | Gb2 (S) | Gb3 (L) | Gb4 (L) | B1 (S) | B2 (L) | | |
| | Gb5 (L) | Gb6 (L) | B3 (L) | B4 (L) | B5 (L) | B6 (L) | |
| Gb7 (L) | Gb8 (L) | Gb9 (S) | Gb10 (L) | B7 (L) | B8 (S) | | |

FIG. 15B

|   |   | R1 (L) | R2 (L) | Gr1 (L) | Gr2 (L) | Gr3 (L) | Gr4 (L) | ... |
|---|---|---|---|---|---|---|---|---|
| R3 (L) | R4 (L) | R5 (L) | R6 (L) | Gr5 (L) | Gr6 (L) |   |   |   |
|   |   | R7 (S) | R8 (S) | Gr7 (S) | Gr8 (S) | Gr9 (L) | Gr10 (L) |   |
| Gb1 (L) | Gb2 (L) | Gb3 (L) | Gb4 (L) | B1 (L) | B2 (L) |   |   |   |
|   |   | Gb5 (L) | Gb6 (L) | B3 (L) | B4 (L) | B5 (L) | B6 (L) |   |
| Gb7 (L) | Gb8 (L) | Gb9 (S) | Gb10 (S) | B7 (S) | B8 (S) |   |   |   |

FIG. 16A

|   |   | R1 (L) | R2 (L) | Gr1 (L) | Gr2 (L) | Gr3 (L) | Gr4 (L) | ... |
|---|---|---|---|---|---|---|---|---|
| R3 (L) | R4 (S) | R5 (S) | R6 (L) | Gr5 (S) | Gr6 (S) |   |   |   |
|   |   | R7 (L) | R8 (L) | Gr7 (L) | Gr8 (L) | Gr9 (L) | Gr10 (L) |   |
| Gb1 (L) | Gb2 (L) | Gb3 (L) | Gb4 (L) | B1 (L) | B2 (L) |   |   |   |
|   |   | Gb5 (S) | Gb6 (S) | B3 (L) | B4 (S) | B5 (S) | B6 (L) |   |
| Gb7 (L) | Gb8 (L) | Gb9 (L) | Gb10 (L) | B7 (L) | B8 (L) |   |   |   |

FIG. 16B

| EXPOSURE TIME | PIXEL COLOR | NUMBER OF PIXELS ADDED | CHARGE-VOLTAGE CONVERSION EFFICIENCY | GAIN (TIMES) |
|---|---|---|---|---|
| LONG TIME | R, B | 4 | 71.8 | 1.400 |
| | G | 6 | 67.0 | 1.000 |
| SHORT TIME | R, B | 4 | 71.8 | 1.400 |
| | G | 4 | 67.0 | 1.500 |

FIG. 20

| FRAME AFTER ADDITION | PIXEL COLOR | NUMBER OF PIXELS ADDED | CHARGE-VOLTAGE CONVERSION EFFICIENCY | GAIN (TIMES) |
|---|---|---|---|---|
| LONG STORAGE FRAME | R, B | 6 | 71.8 | 1.244 |
| | G | 8 | 67.0 | 1.000 |
| SHORT STORAGE FRAME | R, B | 2 | 71.8 | 1.000 |
| | G | 2 | 67.0 | 1.072 |

FIG. 23

| MODE TYPE | NUMBER OF PIXELS ADDED | PHASE DIFFERENCE AF | OUTPUT (ADDITION) RATIO | EXPOSURE TIME RATIO | FRAME RATE (fps) |
|---|---|---|---|---|---|
| NORMAL MODE | G:10<br>R/B:8 | POSSIBLE | — | — | 60 |
| EXPOSURE RATIO MODE | G:6-4<br>R/B:4-4 | POSSIBLE | G 1.5:1<br>R/B 1:1 | 1:4 | 30 |
| | G:4-4-2<br>R/B:4-2-2 | POSSIBLE | G 2:2:1<br>R/B 2:1:1 | 1:4:16 | 20 |
| PIXEL ADDITION RATIO MODE | G:8-2<br>R/B:6-2 | POSSIBLE/<br>NOT POSSIBLE | G 4:1<br>R/B 3:1 | 1:1 | 30 |

| | | 390 | | | |
|---|---|---|---|---|---|
| Gb(S) | Gb(S) | Gb(S) | B(S) | B(S) | B(S) |
| Gb(S) | Gb(S) | Gb(S) | B(S) | B(S) | B(S) |
| Gb(S) | Gb(S) | Gb(S) | B(S) | B(S) | B(S) |
| R(S) | R(S) | R(S) | Gr(S) | Gr(S) | Gr(S) |
| R(S) | R(S) | R(S) | Gr(S) | Gr(S) | Gr(S) |
| R(S) | R(S) | R(S) | Gr(S) | Gr(S) | Gr(S) |

FIG. 26A

| | | 390 | | | |
|---|---|---|---|---|---|
| Gb(L) | Gb(L) | Gb(L) | B(L) | B(L) | B(L) |
| Gb(L) | Gb(L) | Gb(L) | B(L) | B(L) | B(L) |
| Gb(L) | Gb(L) | Gb(L) | B(L) | B(L) | B(L) |
| R(L) | R(L) | R(L) | Gr(L) | Gr(L) | Gr(L) |
| R(L) | R(L) | R(L) | Gr(L) | Gr(L) | Gr(L) |
| R(L) | R(L) | R(L) | Gr(L) | Gr(L) | Gr(L) |

|    |    | 390 |    |    |    |
|----|----|----|----|----|----|
| Gb (L) | Gb (L) | Gb (L) | B (L) | B (L) | B (L) |
| Gb (L) | Gb (S) | Gb (L) | B (L) | B (S) | B (L) |
| Gb (L) | Gb (L) | Gb (L) | B (L) | B (L) | B (L) |
| R (L) | R (L) | R (L) | Gr (L) | Gr (L) | Gr (L) |
| R (L) | R (S) | R (L) | Gr (L) | Gr (S) | Gr (L) |
| R (L) | R (L) | R (L) | Gr (L) | Gr (L) | Gr (L) |

FIG. 28

| FRAME AFTER ADDITION | PIXEL COLOR | NUMBER OF PIXELS ADDED | GAIN (TIMES) |
|---|---|---|---|
| LONG STORAGE FRAME | R, B | 8 | 1.000 |
|  | G | 8 | 1.000 |
| SHORT STORAGE FRAME | R, B | 1 | 1.000 |
|  | G | 1 | 1.000 |

SOLID-STATE IMAGING ELEMENT, IMAGING DEVICE, AND METHOD FOR CONTROLLING SOLID-STATE IMAGING ELEMENT

CROSS REFERENCE TO RELATED APPLICATIONS

This application is a U.S. National Phase of International Patent Application No. PCT/JP2022/038089 filed on Oct. 12, 2022. which claims priority benefit of Japanese Patent Application No. JP 2021-199280 filed in the Japan Patent Office on Dec. 8, 2021. Each of the above-referenced applications is hereby incorporated herein by reference in its entirety.

TECHNICAL FIELD

The present technology relates to a solid-state imaging element. More specifically, the present technology relates to a solid-state imaging element that synthesizes a plurality of images, an imaging device, and a method for controlling a solid-state imaging element.

BACKGROUND ART

High dynamic range (HDR) synthesis processing, which synthesizes a plurality of images with different exposure time, is conventionally used in imaging devices and the like to expand the dynamic range. For example, a solid-state imaging element has been proposed to replace a long-second pixel with a long exposure time with a short-second pixel with a short exposure time in a case where the long-second pixel is a pixel of a moving subject in the HDR synthesis processing (e.g., see Patent Document 1).

CITATION LIST

Patent Document

Patent Document 1: Japanese Patent Application Laid-Open No. 2021-013131

SUMMARY OF THE INVENTION

Problems to be Solved by the Invention

In the conventional technology described above, the residual image is suppressed by replacing a pixel of the moving subject with a short-second pixel. However, in the conventional technology described above, all the pixels of the subject are replaced with short-second pixels, and hence the dynamic range of the area of the subject cannot be expanded. If the solid-state imaging element performs HDR synthesis processing without replacing a pixel of the moving subject with a short-second pixel, the dynamic range of the subject can be expanded, but a residual image may occur. As described above, in the conventional technology described above, it is not possible to expand the dynamic range while suppressing the residual image, making it difficult to improve the image quality of the image data.

The present technology has been created in view of such a situation, and an object of the present technology is to improve image quality in a solid-state imaging element that performs synthesis processing for expanding a dynamic range.

Solutions to Problems

The present technology has been made to solve the problems described above, and a first aspect of the present technology is a solid-state imaging element and a method for controlling the same, which include: a drive section that causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set; and a mode setting section that sets one of the pixel addition ratio mode and the exposure ratio mode on the basis of a predetermined parameter related to an imaging scene. This brings about an effect of improving image quality.

Furthermore, in the first aspect, a pixel array section may be further included, the pixel array section including a predetermined number of pixel blocks in which a plurality of pixels sharing a floating diffusion layer is arranged. In a case where the exposure ratio mode is set, the drive section may drive a pixel at a predetermined position in the pixel block as each of the first pixels, and drives a pixel at a position different from the predetermined position in the pixel block as each of the second pixels. This brings about an effect of being able to obtain a plurality of pixel signals with different exposure times by imaging one frame.

Furthermore, in the first aspect, in each of the pixel blocks, nine pixels are arranged, and in a case where the pixel addition ratio mode is set, the drive section may cause a pixel signal of a central pixel in the pixel block to be generated as a pixel signal of the third pixel, and may cause a signal, obtained by adding pixel signals of eight pixels around the central pixel, to be generated as a pixel signal of the fourth pixel. This brings about an effect of eliminating the need for adjustment using a gain.

Furthermore, in the first aspect, the pixel block may include a deca-pixel block in which ten pixels are arranged, and an octa-pixel block in which eight pixels are arranged. This brings about an effect of facilitating the adjustment of the number of pixels added.

Furthermore, in the first aspect, in a case where the exposure ratio mode is set, the drive section may cause pixel signals of the first pixels to be added and then causes pixel signals of the second pixels to be added, and in a case where the pixel addition ratio mode is set, the drive section may cause a signal, obtained by adding pixel signals of a partial area in the pixel block to be generated as a pixel signal of the third pixel and causes a signal, obtained by adding pixel signals of a remaining area in the pixel block to be generated as a pixel signal of the fourth pixel, and the number of pixels added in the partial area may differ from the number of pixels added in the remaining area. This brings about an effect of generating a pixel signal of each of a plurality of pixels having different sensitivities.

Furthermore, in the first aspect, an image processing section that processes the pixel signal may be further included. A pair of pixels adjacent to each other in the pixel block may share a microlens, and the image processing section may perform processing of acquiring a phase difference from respective pixel signals of the pair of pixels. This brings about an effect of detecting a focused position.

Furthermore, in the first aspect, an amplifier circuit may be further included, the amplifier circuit amplifying a pixel signal in at least one of the deca-pixel block or the octa-pixel block with a gain set on the basis of a ratio of charge-voltage conversion efficiency of each of the deca-pixel block and the octa-pixel block and a ratio of the number of pixels added. This brings about an effect of equalizing the sensitivity of each pixel.

Furthermore, in the first aspect, the parameter may include at least one of an amount of motion of a subject, a shutter speed, or a frame rate. This brings about an effect of reducing blurring.

Furthermore, in the first aspect, the parameter may include international organization for standardization (ISO) sensitivity. This brings about an effect of widening the dynamic range while ensuring the sensitivity.

Furthermore, a second aspect of the present technology is an imaging device including: a drive section that causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set; a mode setting section that sets one of the pixel addition ratio mode and the exposure ratio mode on the basis of a predetermined parameter related to an imaging scene; and a signal processing section that processes the image data read from the drive section. This brings about an effect of improving an image quality of image data captured by the imaging device.

BRIEF DESCRIPTION OF DRAWINGS

FIG. 7 is a diagram for explaining an imaging mode according to the first embodiment of the present technology.

FIGS. 12A and 12B are diagrams illustrating an example of addition targets when exposure is performed three times in the exposure ratio mode according to the first embodiment of the present technology.

FIG. 13 is a diagram illustrating an example of addition targets when exposure is performed four times in the exposure ratio mode according to the first embodiment of the present technology.

FIGS. 15A and 15B are diagrams illustrating an example of addition targets in a case where phase difference AF cannot be performed in a pixel addition ratio mode according to the first embodiment of the present technology.

FIGS. 16A and 16B are diagrams illustrating an example of addition targets in a case where phase difference AF can be performed in the pixel addition ratio mode according to the first embodiment of the present technology.

FIG. 20 is a diagram for explaining a method for setting a gain in the pixel addition ratio mode according to the first embodiment of the present technology.

FIG. 23 is a diagram illustrating an example of setting the imaging mode according to the first embodiment of the present technology.

FIGS. 26A and 26B are diagrams illustrating an example of addition targets in an exposure ratio mode according to the third embodiment of the present technology.

FIG. 27 is a diagram illustrating an example of addition targets in a pixel addition ratio mode according to the third embodiment of the present technology.

FIG. 28 is a diagram for explaining a method for setting a gain in the pixel addition ratio mode according to the third embodiment of the present technology.

MODE FOR CARRYING OUT THE INVENTION

Figure 1:
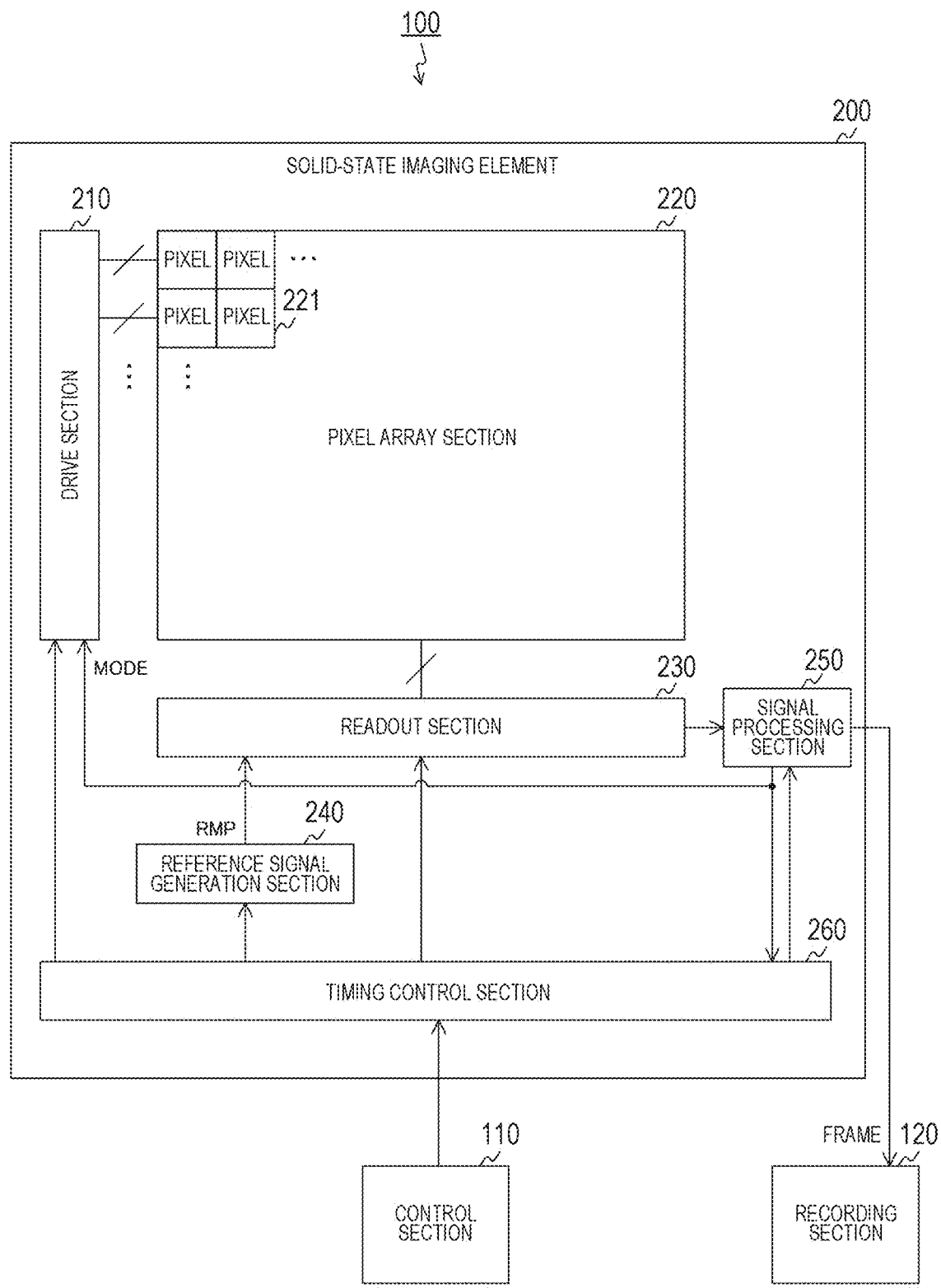
FIG. 1 is a block diagram illustrating a configuration example of an imaging device according to a first embodiment of the present technology.

Hereinafter, modes for carrying out the present technology (hereinafter referred to as embodiments) will be described. The description will be given in the following order.
1. First Embodiment (an example of setting one of an exposure ratio mode and a pixel addition ratio mode)
2. Second Embodiment (an example of setting one of the exposure ratio mode and the pixel addition ratio mode on the basis of ISO sensitivity)
3. Third Embodiment (an example in which a pixel block including nine pixels is arranged and one of an exposure ratio mode and a pixel addition ratio mode is set)
4. Example of Application to Mobile Object 1. First Embodiment Configuration Example of Imaging Device FIG. 1 is a block diagram illustrating a configuration example of an imaging device 100 according to a first embodiment of the present technology. The imaging device 100 is a device for capturing image data, and includes a solid-state imaging element 200, a control section 110, and a recording section 120. As the imaging device 100, a digital camera or an electronic device (a smartphone, a personal computer, etc.) having an imaging function is assumed.

The solid-state imaging element 200 generates image data (i.e., a frame) by photoelectric conversion, and includes a drive section 210, a pixel array section 220, a readout section 230, a reference signal generation section 240, a signal processing section 250, and a timing control section 260.

The control section 110 controls the solid-state imaging element 200 to capture the frame. The control section 110 supplies an imaging control signal including, for example, a vertical synchronization signal to the solid-state imaging element 200. The recording section 120 records a frame.

Here, the vertical synchronization signal is a signal indicating imaging timing, and a periodic signal having a constant frequency (60 hertz, etc.) is used as the vertical synchronization signal.

In the pixel array section 220 of the solid-state imaging element 200, a plurality of pixels 221 is arranged in a two-dimensional lattice pattern. The drive section 210 drives the pixel array section 220 to output the pixel signal to the readout section 230.

The readout section 230 performs analog-to-digital (AD) conversion processing and correlated double sampling (CDS) processing on each of the pixel signals. The readout section 230 supplies a frame in which the processed signals are arranged to the signal processing section 250.

The signal processing section 250 performs various types of image processing such as HDR synthesis processing and demosaic processing on the frame. The signal processing section 250 supplies the processed frame to the recording section 120.

Furthermore, the signal processing section 250 sets the imaging mode of the solid-state imaging element 200 and generates a mode signal MODE indicating the set mode. Details of the imaging mode will be described later. The mode signal MODE is supplied to the drive section 210 and the timing control section 260.

The reference signal generation section 240 performs digital-to-analog (DA) conversion on the signal from the timing control section 260 to generate a reference signal RMP. For example, a sawtooth-shaped ramp signal is used as the reference signal, and for example, a digital to analog converter (DAC) is used as the reference signal generation section 240. The reference signal generation section 240 supplies the generated reference signal RMP to the readout section 230.

The timing control section 260 controls the operation timing of each of the drive section 210, the reference signal generation section 240, and the readout section 230 in synchronization with the vertical synchronization signal from the control section 110.

Note that, although the imaging device 100 records the frame, the frame may be transmitted to the outside of the imaging device 100. In this case, an external interface for sending a frame is further provided. In addition, the imaging device 100 may display a frame. In this case, a display section is further provided.

Configuration Example of Pixel Array Section

Figure 2:
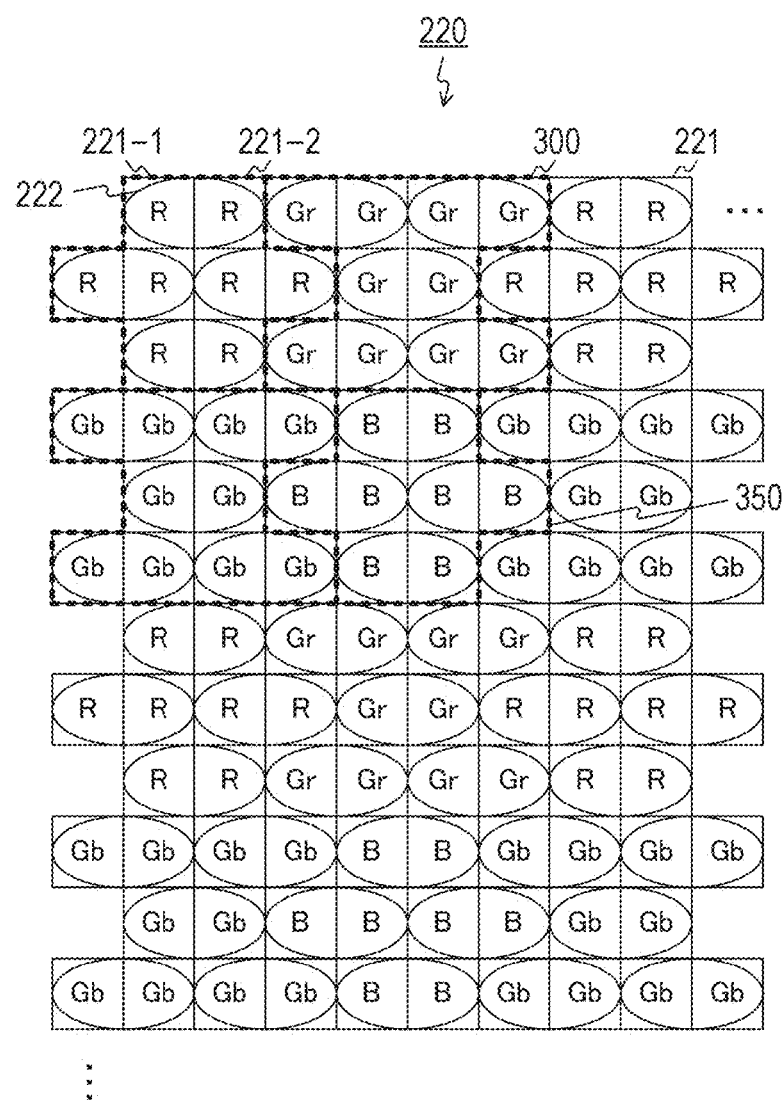
FIG. 2 is an example of a plan view of a pixel array section according to the first embodiment of the present technology.

FIG. 2 is an example of a plan view of the pixel array section 220 according to the first embodiment of the present technology. Each of the pixels 221 receives and photoelectrically converts visible light of any of red (R), green (G), and blue (B) colors. Hereinafter, the pixels 221 that receive R, G, and B are referred to as an "R pixel", a "G pixel", and a "B pixel", respectively. Furthermore, "Gr" indicates G pixels arranged in a row including an R pixel, and "Gb" indicates G pixels arranged in a row including a B pixel.

Furthermore, the pixel array section 220 includes a predetermined number of pixel blocks in each of which a plurality of pixels is arranged. It is assumed that the pixels in the pixel block are not shielded from light. In the pixel array section, light-shielded pixels, which are shielded from light, can be arranged in addition to the pixel block.

For example, two types of pixel blocks, a deca-pixel block 300 and an octa-pixel block 350, are arranged. In the deca-pixel block 300, ten G pixels are arranged, and these pixels share a floating diffusion layer (not illustrated). In the octa-pixel block 350, eight R pixels or eight B pixels are arranged, and these pixels share a floating diffusion layer. In the figure, an area surrounded by a thick dotted line indicates the deca-pixel block 300 or the octa-pixel block 350. As exemplified in the figure, the deca-pixel block 300 and the octa-pixel block 350 are alternately arranged in each of the horizontal direction and the vertical direction.

In the deca-pixel block 300, G pixels are arranged at ten positions, excluding both ends of the second row, from 12 positions of 3 rows×4 columns. The shape of the deca-pixel block 300 can also be expressed as a shape obtained by rotating the alphabet "H" by 90 degrees.

In the octa-pixel block 350, R pixels or B pixels are arranged at eight positions, excluding both ends of each of the first row and the third row, from 12 positions of 3 rows×4 columns. The octa-pixel block 350 can also be expressed as a cross shape.

Furthermore, in each of the deca-pixel block 300 and the octa-pixel block 350, a pair of adjacent pixels in the same row, such as pixels 221-1 and 221-2, share a microlens 222. The subsequent circuit can acquire a phase difference from the pixel signals of these pixels and perform phase difference auto-focusing (AF) for detecting a focused position from the phase difference.

Figure 3:
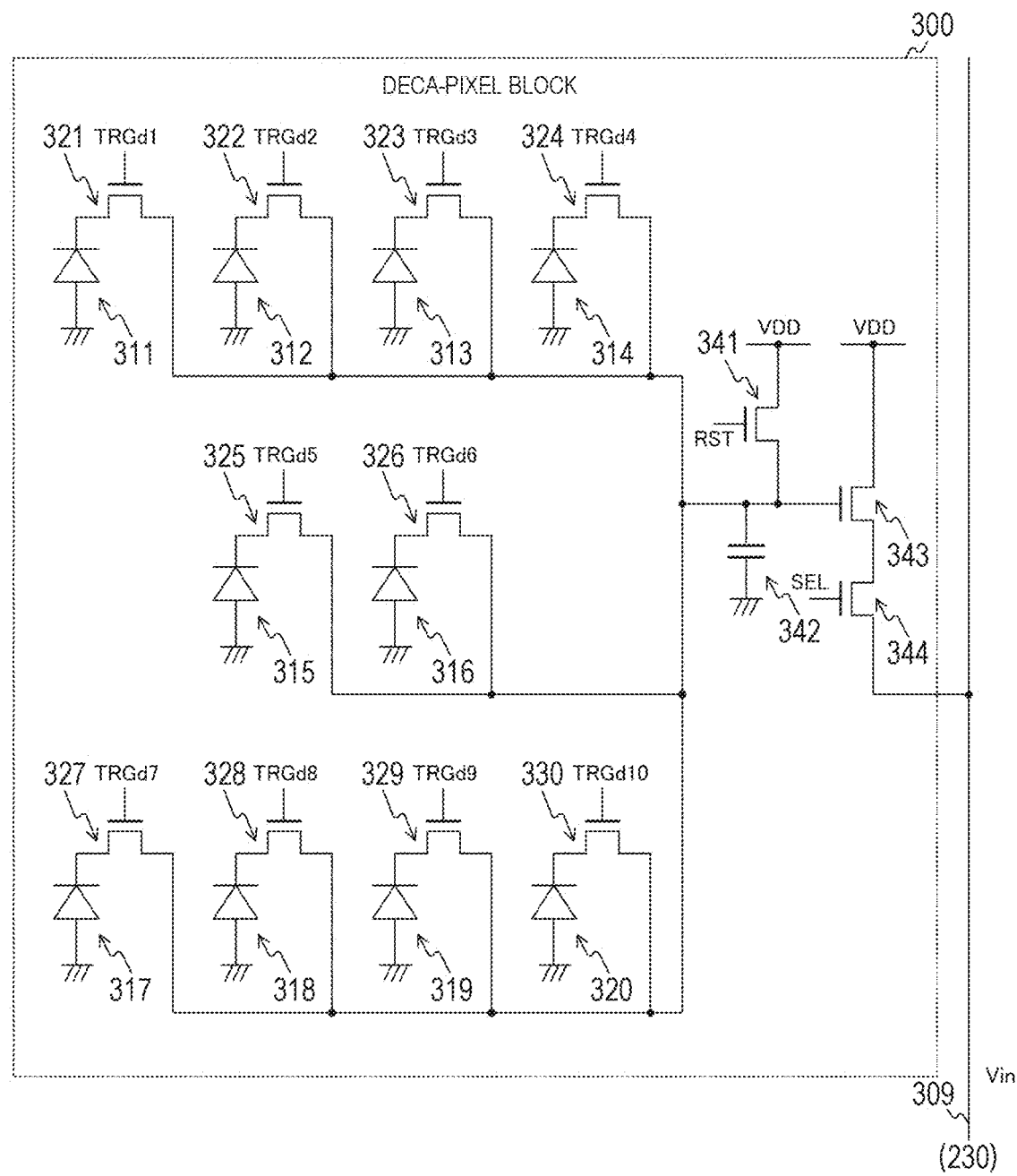
FIG. 3 is a circuit diagram illustrating a configuration example of a deca-pixel block according to the first embodiment of the present technology.

FIG. 3 is a circuit diagram illustrating a configuration example of the deca-pixel block 300 according to the first embodiment of the present technology. The deca-pixel block 300 includes photoelectric conversion elements 311 to 320, transfer transistors 321 to 330, a reset transistor 341, a floating diffusion layer 342, an amplification transistor 343, and a selection transistor 344.

Each of the photoelectric conversion elements 311 to 320 generates a charge by photoelectric conversion. The transfer transistor 321 transfers a charge from the photoelectric conversion element 311 to the floating diffusion layer 342 in accordance with a transfer signal TRGd1 from the drive section 210. Similarly, the transfer transistors 322 to 330 transfer charges from the photoelectric conversion elements 312 to 320 to the floating diffusion layer 342 in accordance with transfer signals TRGd2 to TRGd10 from the drive section 210.

The reset transistor 341 initializes the floating diffusion layer 342 in accordance with a reset signal RST from the drive section 210. The floating diffusion layer 342 accumulates charges and generates a voltage corresponding to the amount of charge. The amplification transistor 343 amplifies the voltage of the floating diffusion layer 342. The selection transistor 344 outputs an analog signal amplified by the amplification transistor 343 to a vertical signal line 309 as a pixel signal Vin in accordance with a selection signal SEL from the drive section 210. In the pixel array section 220, one vertical signal line 309 is wired for each column of the pixel block.

As exemplified in the figure, ten pixels in the deca-pixel block 300 share the floating diffusion layer 342. Furthermore, in the circuit configuration described above, the level of the pixel signal Vin when the floating diffusion layer 342 is initialized is hereinafter referred to as a "P-phase level" or a "reset level". Furthermore, the level of the pixel signal Vin when the charge is transferred to the floating diffusion layer 342 is hereinafter referred to as a "D-phase level" or a "signal level".

Figure 4:
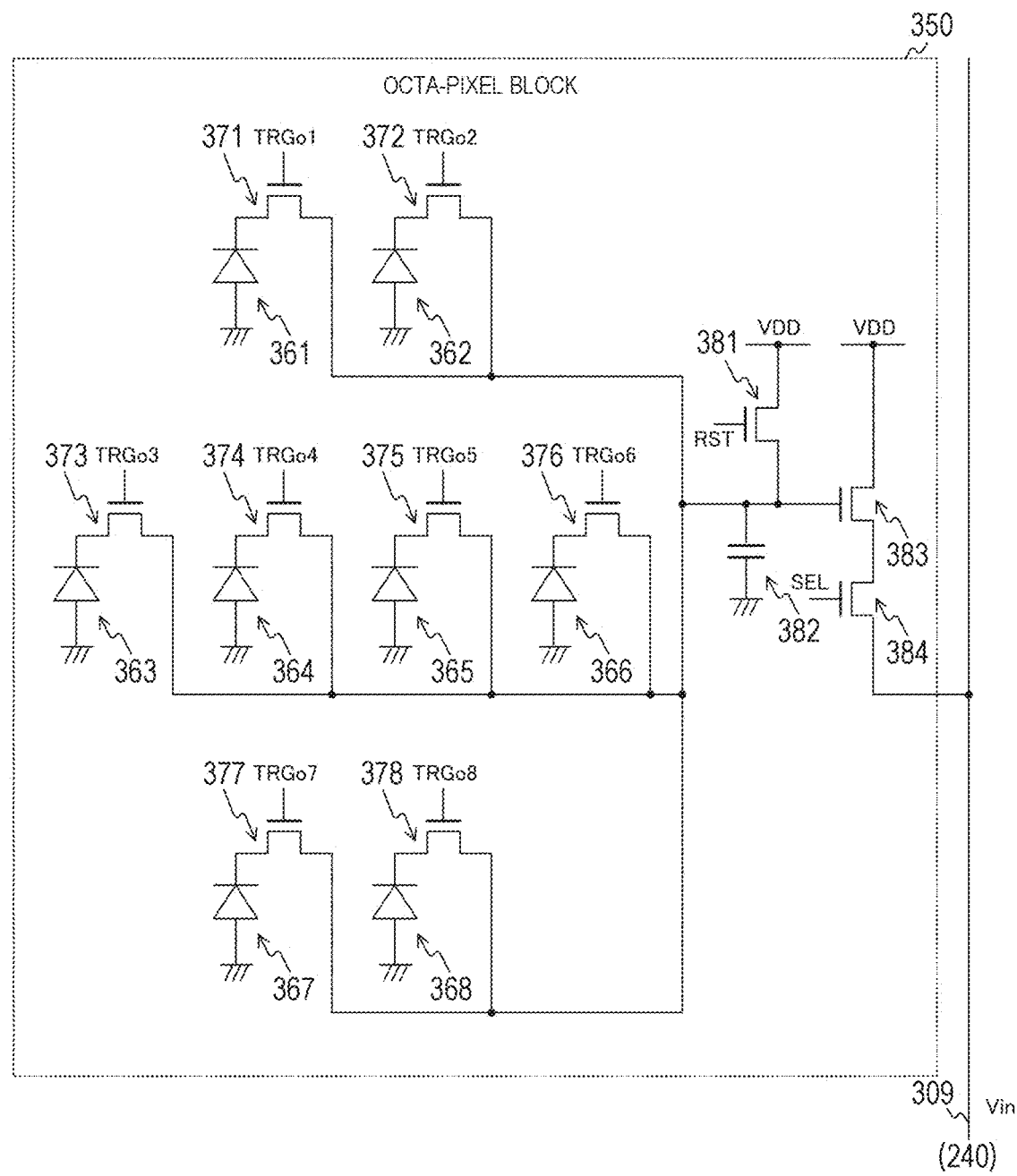
FIG. 4 is a circuit diagram illustrating a configuration example of an octa-pixel block according to the first embodiment of the present technology.

FIG. 4 is a circuit diagram illustrating a configuration example of the octa-pixel block 350 according to the first embodiment of the present technology. The octa-pixel block 350 includes photoelectric conversion elements 361 to 368, transfer transistors 371 to 378, a reset transistor 381, a floating diffusion layer 382, an amplification transistor 383, and a selection transistor 384.

The circuit configuration of the octa-pixel block 350 is similar to that of the deca-pixel block 300 exemplified in FIG. 3 except that the number of photoelectric conversion elements and the number of transfer transistors are 8. That is, the eight pixels in the octa-pixel block 350 share the floating diffusion layer 382.

However, the deca-pixel block 300 and the octa-pixel block 350 are different in the number of transfer transistors connected to the floating diffusion layer. Therefore, the number of parasitic capacitances of the transfer transistors connected to the floating diffusion layer differs, and the charge-voltage conversion efficiency of the floating diffusion layer has a different value. Since the deca-pixel block 300 has a larger parasitic capacitance than the octa-pixel block 350, the charge-voltage conversion efficiency decreases accordingly.

Configuration Example of Readout Section

Figure 5:
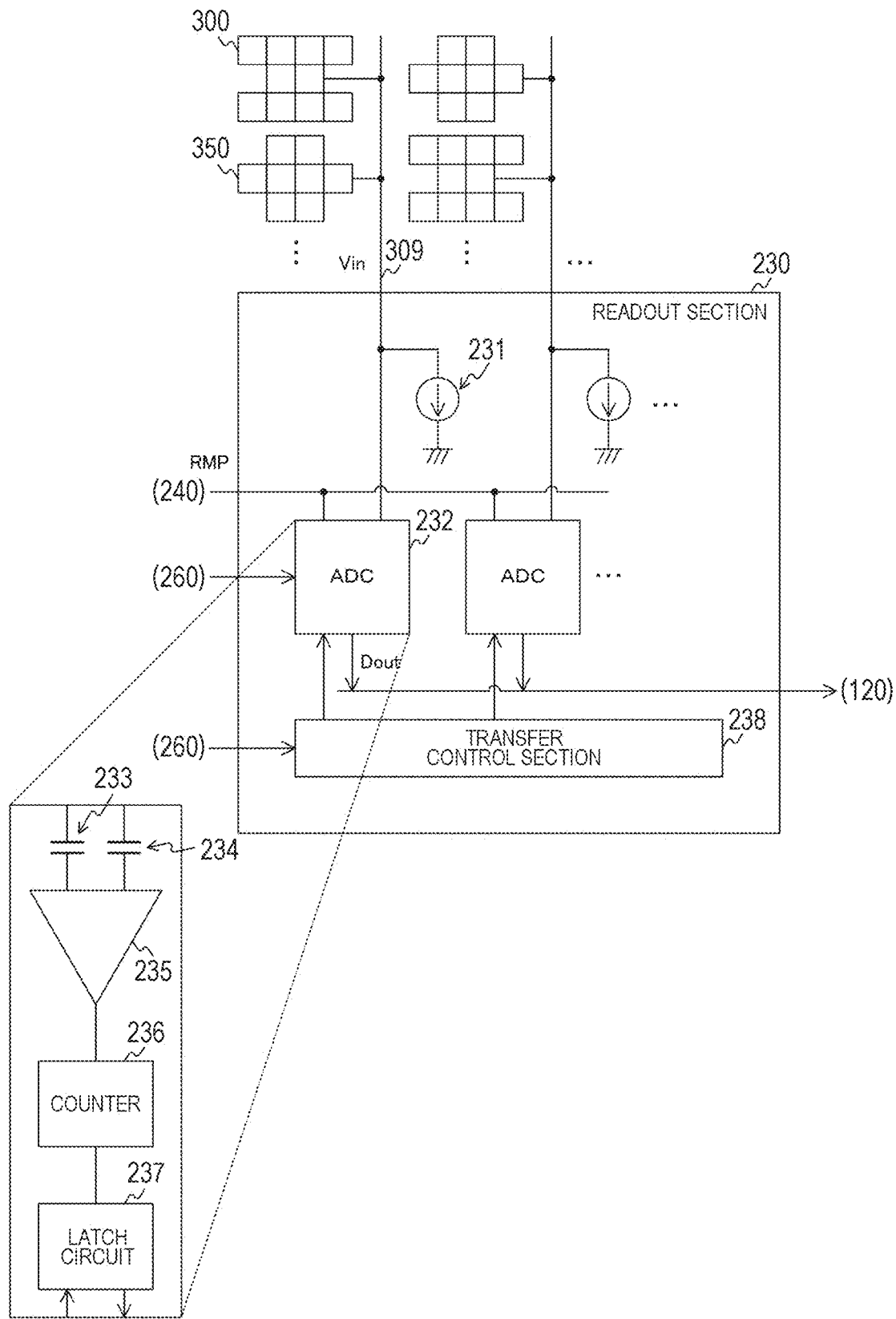
FIG. 5 is a block diagram illustrating a configuration example of a readout section according to the first embodiment of the present technology.

FIG. 5 is a block diagram illustrating a configuration example of the readout section 230 according to the first embodiment of the present technology. The readout section 230 includes a plurality of load current sources 231, a plurality of analog-to-digital converters (ADCs) 232, and a transfer control section 238. The load current source 231 and the ADC 232 are arranged for each column of the pixel block.

The load current source 231 is connected to the vertical signal line 309 of the corresponding column. The ADC 232 converts the analog pixel signal Vin from the corresponding column into a digital signal. The ADC 232 includes, for example, capacitors 233, 234, a comparator 235, a counter 236, and a latch circuit 237.

The reference signal RMP from the reference signal generation section 240 and the pixel signal Vin from the corresponding column are input to the comparator 235 via the capacitors 233, 234. The comparator 235 compares the signals and supplies a comparison result to the counter 236.

The counter 236 performs counting to obtain a count value over a period until the comparison result is inverted. The counter 236 supplies a digital signal indicating the count value to the latch circuit 237.

Here, the counter 236 performs (down-counting (or up-counting) to obtain a count value when the P-phase level (reset level) is converted, and performs up-counting (or down-counting) when converting the D-phase level (signal level). As a result, the CDS processing for obtaining the difference between the P-phase level and the D-phase level can be realized. Note that the counter 236 may only perform either counting-up or down-counting, and the CDS processing may be performed by a subsequent circuit.

The latch circuit 237 holds the digital signal and outputs the digital signal as a digital pixel signal Dout in accordance with the control of the transfer control section 238. The transfer control section 238 controls each of the ADCs 232 to sequentially output the pixel signal Dout.

It is assumed that the timing control section 260 can control the reference signal generation section 240 to change the inclination of the reference signal RMP. The gentler the slope of the reference signal RMP, the greater the analog gain of ADC 232.

Note that one ADC 232 is disposed for each column of the pixel block, but the present invention is not limited to this configuration. Two or more ADCs 232 may be arranged for each column of the pixel block. In this case, two or more vertical signal lines 309 are wired for each column.

Figure 6:
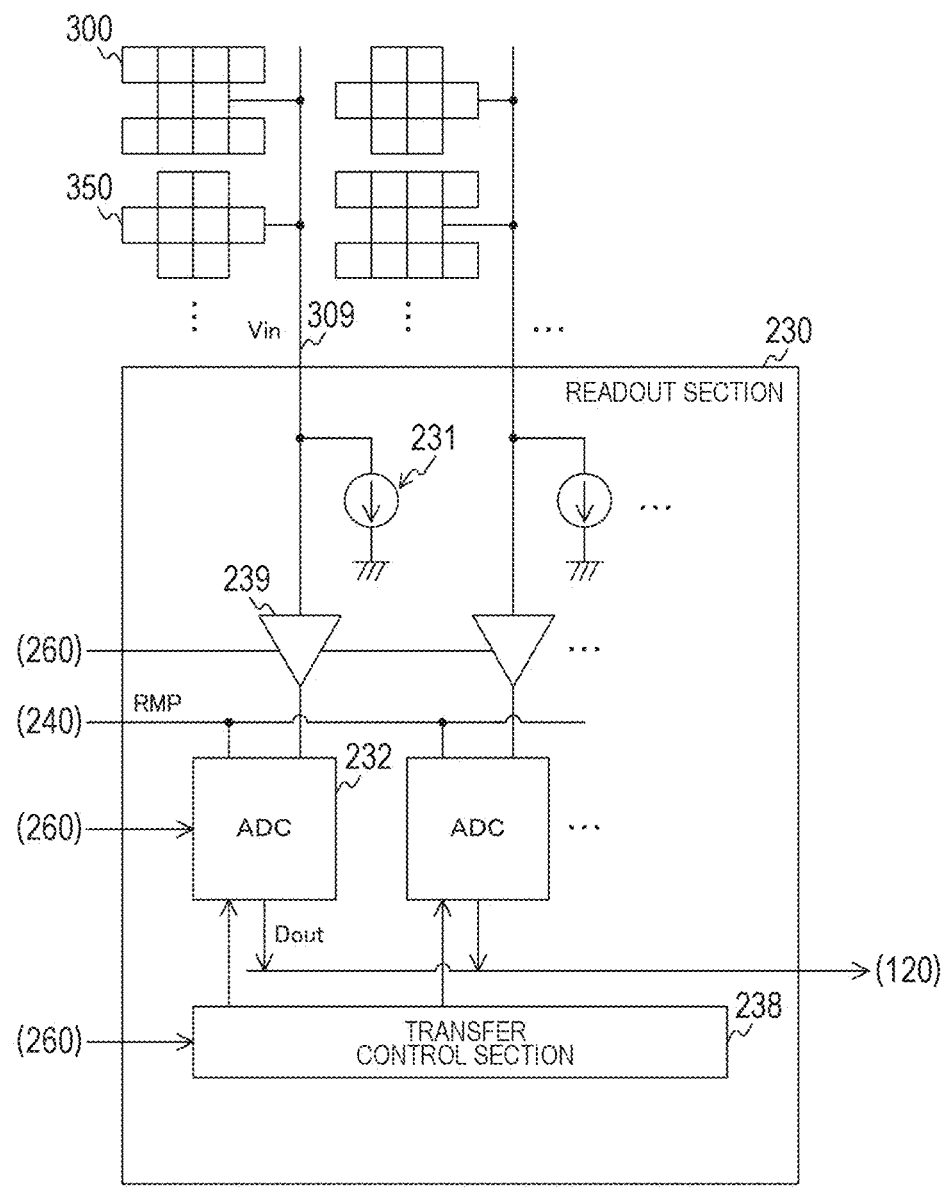
FIG. 6 is a block diagram illustrating a configuration example of a readout section to which a column amplifier is added according to the first embodiment of the present technology.

Furthermore, as exemplified in FIG. 6, a column amplifier 239 can be added for each column of the pixel block, and the timing control section 260 can also control the analog gain of the column amplifier 239. Details of the analog gain setting method in FIG. 5 or 6 will be described later.

FIG. 7 is a diagram for explaining an imaging mode according to the first embodiment of the present technology. The imaging mode is classified into a normal mode in which HDR synthesis processing is not performed and an HDR mode in which HDR synthesis processing is performed. The HDR mode is classified into an exposure ratio mode and a pixel addition ratio mode.

In the normal mode, the number of exposures at the time of generating one frame is 1. Furthermore, the drive section 210 can cause pixel signals of pixels of the same color in each pixel block to be added. Since ten G pixels are arranged in the deca-pixel block 300, ten G pixels can be added at the maximum. Since eight R pixels or B pixels are arranged in the octa-pixel block, eight R pixels or B pixels can be added at the maximum.

The exposure ratio mode is a mode in which a plurality of exposures with different exposure times are performed when HDR synthesis is performed. In this exposure ratio mode, the drive section 210 causes pixels with the same exposure time to undergo pixel addition in each pixel block.

For example, the drive section 210 causes six G pixels in the deca-pixel block 300 to be exposed for the same exposure time and to undergo pixel addition. Furthermore, the drive section 210 causes the remaining four G pixels in the deca-pixel block 300 to be exposed for a shorter exposure time and to undergo pixel addition. In the figure, "G:6-4"

means that the six pixels in the deca-pixel block 300 are added and the remaining four pixels with a different exposure time are added.

Furthermore, the drive section 210 causes the four R pixels or B pixels in the octa-pixel block 350 to be exposed for the same exposure time and to undergo pixel addition. Furthermore, the drive section 210 causes the remaining four pixels in the octa-pixel block 350 to be exposed for a shorter exposure time and to undergo pixel addition. In the figure, "R/B:4-4" means that the four pixels in the octa-pixel block 350 are added and the remaining four pixels with a different exposure time are added.

A frame including pixel signals after pixel addition corresponding to a longer exposure time is hereinafter referred to as a "long storage frame". Furthermore, a frame including pixel signals after pixel addition corresponding to the shorter exposure time is hereinafter referred to as a "short storage frame".

The pixel addition ratio mode is a mode in which the sensitivity of a partial area in the shared block is made higher than that of the remaining area by pixel addition when HDR synthesis is performed. In this pixel addition ratio mode, the drive section 210 causes the pixel signals of a partial area to be added and causes the pixel signals of the remaining area to be added in each pixel block. However, the number of pixels added differs in each area. In each area, the number of pixels added differs although the exposure time is the same, and hence the sensitivity has a different value in each area. Therefore, the dynamic range can be expanded by synthesizing the pixel signals.

The drive section 210 causes all the pixels to be exposed for the same exposure time. Then, for example, the drive section 210 causes eight G pixels out of ten G pixels in the deca-pixel block 300 to undergo pixel addition, and causes the remaining two G pixels to undergo pixel addition. As a result, two pixel signals with different numbers of pixels added are generated. In the figure, "G:8-2" means that eight pixels in the deca-pixel block 300 are added, and the remaining two pixels with the same exposure time are added.

Furthermore, the drive section 210 causes six R pixels or B pixels out of the eight R pixels or B pixels in the octa-pixel block 350 to undergo pixel addition, and causes the remaining two pixels to undergo pixel addition. As a result, two pixel signals with different numbers of pixels added are generated. In the figure, "R/B:6-2" means that six pixels in the octa-pixel block 350 are added and the remaining two pixels with the same exposure time are added.

A frame including the pixel signals with the larger number of pixels added after pixel addition is referred to as a "long storage frame", similarly to the case where the exposure time is long. Furthermore, a frame including the pixel signals with the smaller number of pixels added after pixel addition is referred to as a "short storage frame", similarly to the case where the exposure time is short. In the pixel addition ratio mode, although the long storage frame and the short storage frame have the same exposure times, their sensitivities differ because their numbers of pixels added differ. Therefore, the dynamic range can be expanded by synthesizing these frames.

Configuration Example of Signal Processing Section

Figure 8:
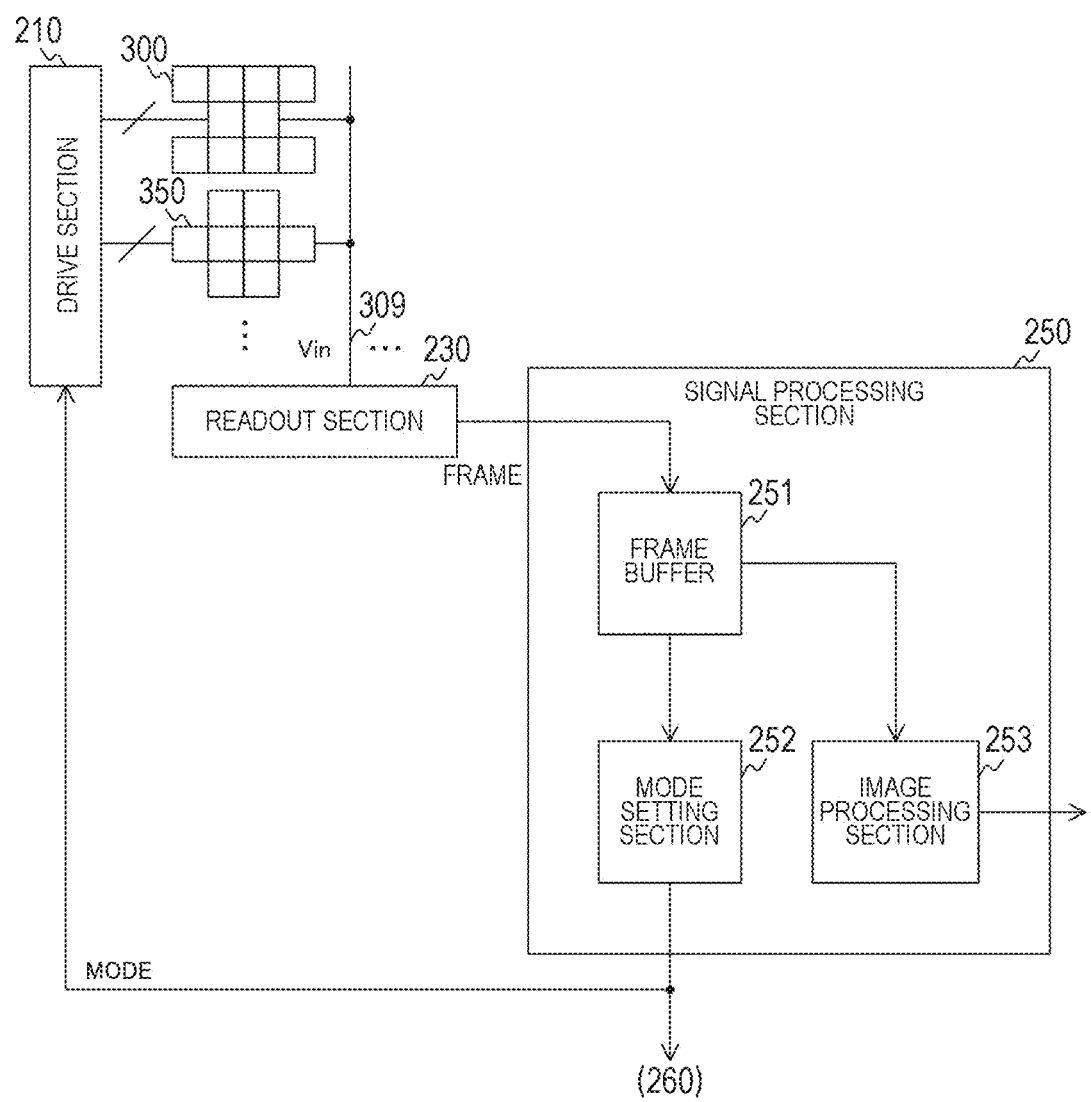
FIG. 8 is a block diagram illustrating a configuration example of a signal processing section according to the first embodiment of the present technology.

FIG. 8 is a block diagram illustrating a configuration example of the signal processing section 250 according to the first embodiment of the present technology. The signal processing section 250 includes a frame buffer 251, a mode setting section 252, and an image processing section 253. The frame buffer 251 holds the frame from the readout section 230.

The mode setting section 252 sets an imaging mode. For example, it is assumed that the control section 110 sets one of the normal mode and the HDR mode in accordance with a user operation. The mode setting section 252 determines whether the current imaging mode is the normal mode or the HDR mode.

In a case where the current imaging mode is the HDR mode, the mode setting section 252 sets one of the exposure ratio mode and the pixel addition ratio mode on the basis of a predetermined parameter related to an imaging scene.

For example, the amount of motion of the subject, the shutter speed, the frame rate, and the like are used as the parameters related to the imaging scene. In a case where the amount of motion is smaller than a predetermined value, the exposure ratio mode is set, and otherwise, the pixel addition ratio mode is set. Furthermore, in a case where the shutter speed is longer than a predetermined value, the exposure ratio mode is set, and otherwise, the pixel addition ratio mode is set. Furthermore, in a case where the frame rate is lower than the predetermined value, the exposure ratio mode is set, and otherwise, the pixel addition ratio mode is set. Note that the configuration is not limited to the configuration using only one of the amount of motion, the shutter speed, and the frame rate, and the mode setting section 252 can also set the mode using a plurality of parameters.

The mode setting section 252 generates a mode signal MODE indicating the set mode, and supplies the mode signal MODE to the drive section 210 and the timing control section 260. Note that either the normal mode or the HDR mode is set in accordance with the user operation, but the present invention is not limited to this configuration. The mode setting section 252 can also set either the normal mode or the HDR mode on the basis of the imaging scene or the like.

The image processing section 253 reads a frame from the frame buffer 251 and performs various types of image processing. In a case where the normal mode is set, the image processing section 253 executes phase difference AF, demosaic processing, and the like as necessary. On the other hand, in a case where the HDR mode is set, the image processing section 253 executes HDR synthesis processing of synthesizing a long storage frame and a short storage frame. The image processing section 253 can further perform demosaic processing or the like after HDR synthesis processing. Furthermore, the image processing section 253 can also perform phase difference AF in addition to HDR synthesis processing. The image processing section 253 outputs the processed frame.

In a case where the exposure ratio mode is set, the drive section 210 drives the pixel array section 220 to cause the plurality of pixels to be exposed over different exposure times. On the other hand, in a case where the pixel addition ratio mode is set, the drive section 210 sets the sensitivity of a partial area in the pixel block to a value different from that of the remaining area by pixel addition.

For example, in a case where the exposure ratio mode is set, the drive section 210 causes six pixels in the deca-pixel block 300 to be exposed over a long period of time and to undergo pixel addition. Furthermore, the drive section 210 causes four pixels in the deca-pixel block 300 to be exposed over a short period of time and to undergo pixel addition. In the octa-pixel block 350, four pixels out of the eight pixels and the remaining four pixels are exposed for different exposure times. Note that the six pixels or the four pixels with the longer exposure time are examples of first pixels recited in the claims, and the four pixels with the shorter exposure time are second pixels recited in the claims.

Furthermore, for example, in a case where the pixel addition ratio mode is set, the drive section 210 causes eight pixels in the deca-pixel block 300 to be added and the remaining two pixels to be added. In the octa-pixel block 350, six pixels are added, and the remaining two pixels are added. Note that a pixel obtained by adding six pixels or eight pixels is an example of a third pixel recited in the claims. A pixel obtained by adding two pixels is an example of a fourth pixel recited in the claims.

Furthermore, the timing control section 260 adjusts the gain for the analog pixel signal in accordance with the imaging mode. A gain adjustment method will be described later.

Furthermore, the solid-state imaging element 200 adds analog pixel signals, but is not limited to this configuration, and can also add digital pixel signals. Moreover, although the solid-state imaging element 200 adjusts the gain for the analog pixel signal, it is also possible to adjust the gain for the digital pixel signal.

Figure 9:
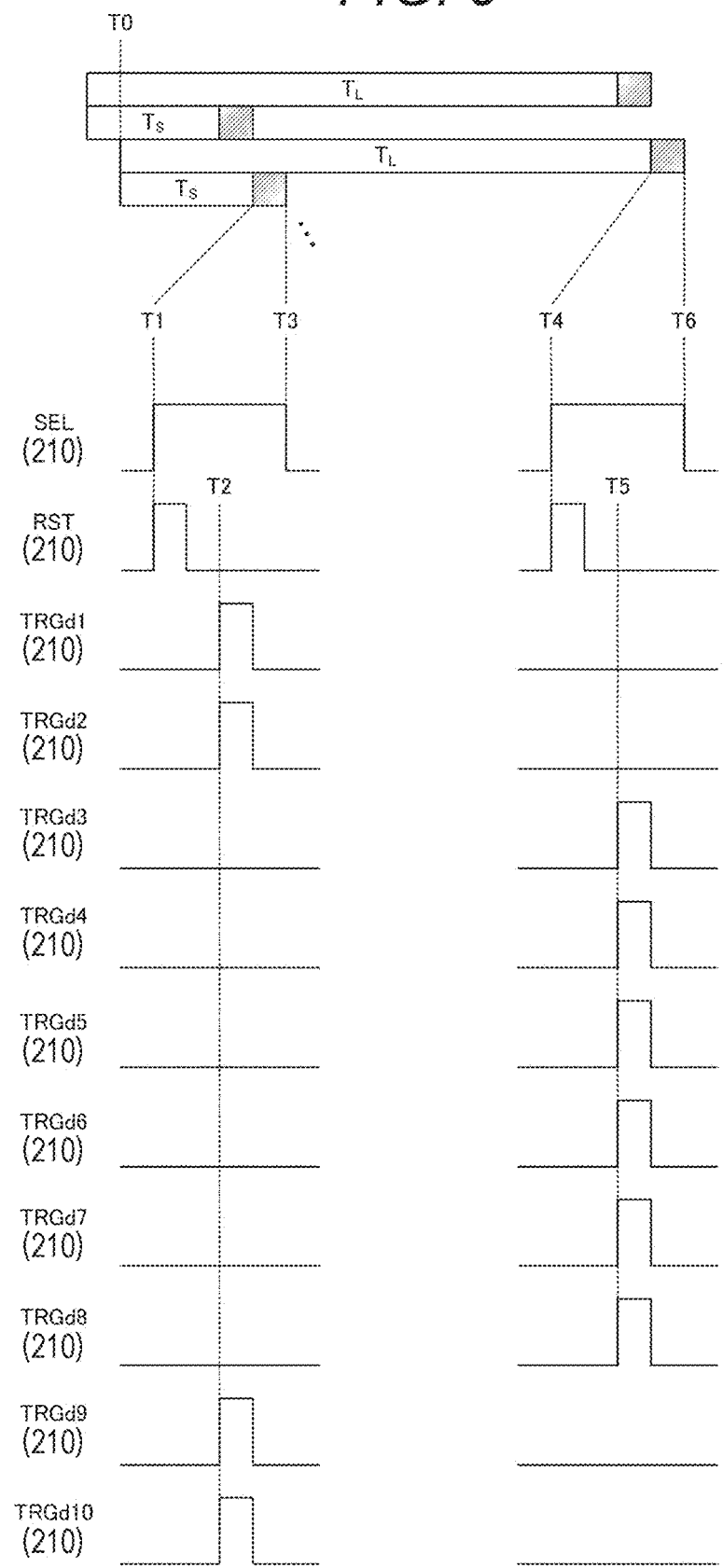
FIG. 9 is a timing chart illustrating an example of a driving method in an exposure ratio mode in a case where phase difference auto-focusing (AF) is not performed according to the first embodiment of the present technology.

FIG. 9 is a timing chart illustrating an example of a driving method in the exposure ratio mode in a case where phase difference AF is not performed according to the first embodiment of the present technology. The drive section 210 causes the rows of the pixel block to be sequentially selected and exposed.

Timing T0 is a timing to start exposure of a predetermined row. At timing T0, the drive section 210 controls the reset transistor and the transfer transistors of the ten pixels in the deca-pixel block 300 of the row to be in an on-state to start exposure of those pixels.

In addition, the number of exposures is set to 2, with the longer exposure time being $T_L$, and the shorter exposure time being $T_S$. Timing T2 at which $T_S$ has elapsed from timing T0 is a shorter exposure end timing. At timing T1 immediately before timing T2, the drive section 210 sets the selection signal SEL to the high level and sets the reset signal RST to the high level over a pulse period. As a result, the floating diffusion layer 342 in the deca-pixel block 300 is initialized.

Then, at timing T2, the drive section 210 sets the transfer signals TRGd1, TRGd2, TRGd9, TRGd10 to the high level over a pulse period. As a result, charges are transferred from the four pixels, and the pixel signals of these pixels are added. At timing T3, the drive section 210 sets the selection signal SEL to the low level.

In addition, timing T5 at which $T_L$ has elapsed from timing T0 is a longer exposure end timing. At timing T4 immediately before timing T5, the drive section 210 sets the selection signal SEL to the high level and sets the reset signal RST to the high level over a pulse period. As a result, the floating diffusion layer 342 is initialized.

Then, at timing T5, the drive section 210 sets the transfer signals TRGd3 to TRGd8 to the high level over a pulse period. As a result, charges are transferred from the six pixels, and pixel signals of these pixels are added. At timing T6, the drive section 210 sets the selection signal SEL to the low level.

The readout section 230 reads the P-phase level (reset level) immediately after timings T1, T4, reads the D-phase level (signal level) immediately after timings T2, T5, and obtains a difference therebetween as a net signal level.

The driving method for the octa-pixel block 350 is similar to that for the deca-pixel block 300 except that four pixels are exposed over a long period of time and that the remaining four pixels are exposed over a short period of time.

By the driving method exemplified in the figure, the pixel signals of the four pixels with the shorter exposure time undergo pixel addition and are read. Then, the pixel signals of the six pixels with the longer exposure time undergo pixel addition and are read. In the driving method in the figure, the image processing section 253 cannot perform phase difference AF, but the drive section 210 can drive the pixel so that phase difference AF can be performed.

Figure 10:
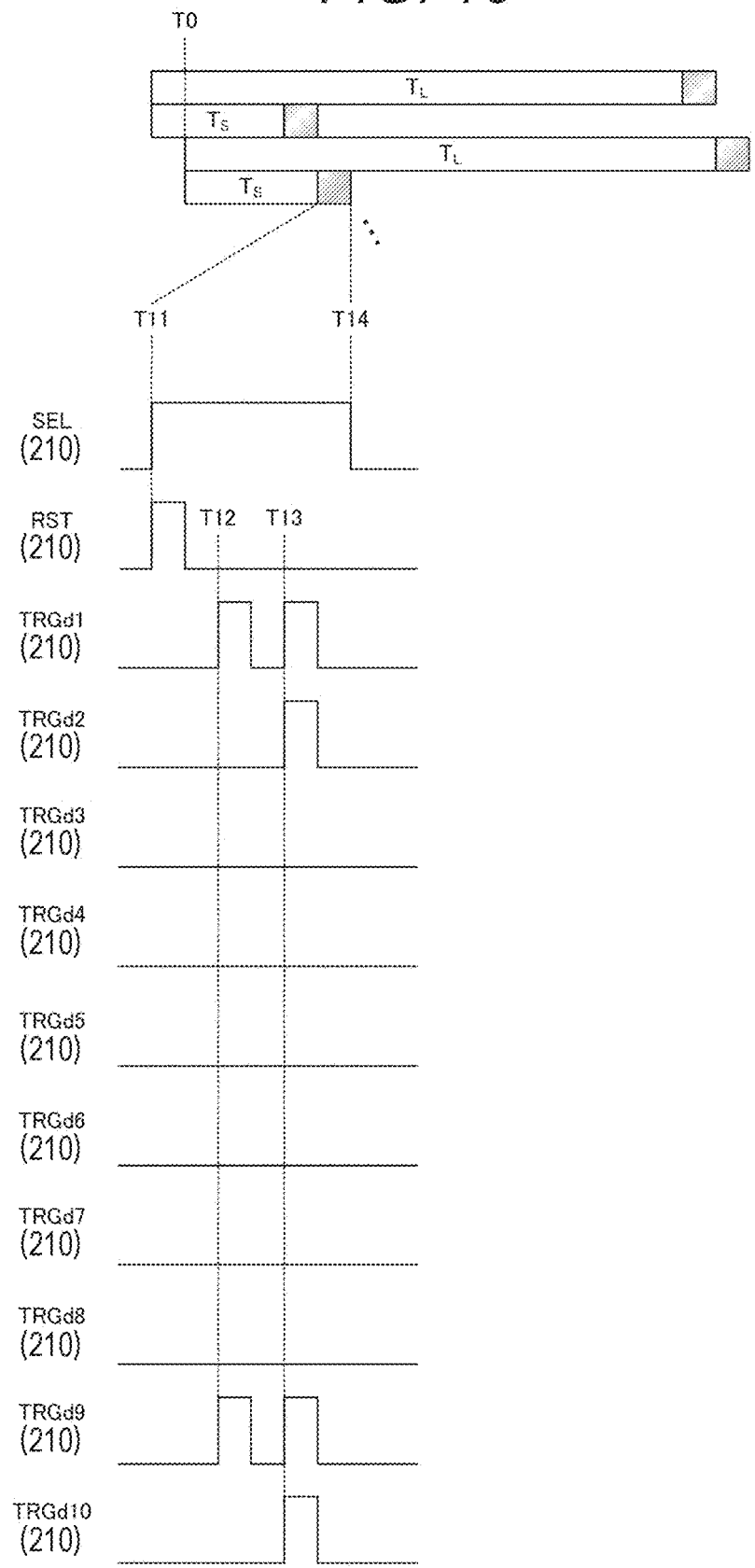
FIG. 10 is a timing chart illustrating an example of a driving method in the exposure ratio mode in a case where phase difference AF is performed according to the first embodiment of the present technology.

FIG. 10 is a timing chart illustrating an example of a driving method in the exposure ratio mode in a case where phase difference AF is performed according to the first embodiment of the present technology. In a case where phase difference AF is performed, the drive section 210 sets the selection signal SEL to the high level at timing T11 immediately before the end of the exposure, and sets the reset signal RST to the high level over a pulse period. As a result, the floating diffusion layer 342 is initialized.

Then, at timing T12, the drive section 210 sets the transfer signals TRGd1, TRGd9 to the high level over a pulse period. As a result, the charge is transferred from the left side of each of the two pairs of pixels. At timing T13 at the end of the exposure, the drive section 210 sets the transfer signals TRGd1, TRGd2, TRGd9, TRGd10 to the high level over a pulse period. As a result, charges are transferred from the two pairs of pixels. At timing T14, the drive section 210 sets the selection signal SEL to the low level.

The readout section 230 reads the P-phase level (reset level) immediately after timing T11, and reads the D-phase level (signal level) immediately after each of timings T12, T13. The first D-phase level corresponds to the D-phase level of the signal obtained by adding the left sides of the two pairs of pixels. The second D-phase level corresponds to the D-phase level of the signal obtained by adding the two pairs of pixels. The readout section 230 acquires a net D-phase level on the left side from the difference between the D-phase level and the P-phase level of the first time. In addition, the readout section 230 subtracts the first D-phase level and the P-phase level from the second D-phase level to acquire a net D-phase level on the right side. The signal processing section 250 at the subsequent stage acquires a phase difference from the D-phase level on the left side and the D-phase level on the right side, and performs phase difference AF. Note that, instead of the readout section 230, the signal processing section 250 can also obtain the difference between the P-phase level and the D-phase level.

As exemplified in the figure, a driving method to read in order of the P-phase level, the D-phase level, and the D-phase level is hereinafter referred to as "PDD reading". The PDD reading is also performed for the remaining six pixels in the deca-pixel block 300. The PDD reading is also performed in the octa-pixel block 350. Note that while the phase difference can be detected in all pixel blocks, the phase difference can also be detected only in a partial area, as necessary.

Figures 11A, 11B, 11C:
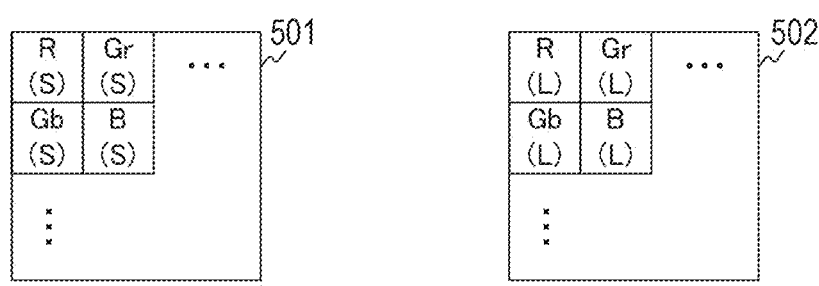
FIGS. 11A, 11B, and 11C are diagrams illustrating an example of addition targets and a frame when exposure is performed twice in the exposure ratio mode according to the first embodiment of the present technology.

FIGS. 11A, 11B, and 11C are diagrams illustrating an example of addition targets and a frame when exposure is performed twice in the exposure ratio mode according to the first embodiment of the present technology. In the figure, "a" illustrates a diagram illustrating an example of addition targets. In the figure, "b" represents a diagram illustrating an example of a short storage frame 501 after addition. In the figure, "c" represents a diagram illustrating an example of a long storage frame 502 after addition.

Four pixels in the first row within the deca-pixel block 300 are set as Gr1 to Gr4 in order from the left, two pixels in the second row are set as Gr5 and Gr6 in order from the left, and four pixels in the third row are set as Gr7 to Gr10 in order from the left. Furthermore, two pixels in the first row within the octa-pixel block 350 are set as B1 and B2 in order from the left, four pixels in the second row are set as B3 to B6 in order from the left, and two pixels in the third row are set as B7 and B8 in order from the left. R pixels and Gb pixels are similarly set as R1 to R8 and Gb1 to Gb10.

As exemplified in FIG. 11A, for example, the drive section 210 causes Gr1, Gr2, Gr9, Gr10 to be exposed for a shorter exposure time. In the figure, "(S)" indicates that the exposure time is short. Furthermore, the drive section 210 causes the remaining Gr3 to Gr8 to be exposed for a longer exposure time. In the figure, "(L)" indicates that the exposure time is long. In the octa-pixel block 350, B1, B2, B9, B10 are exposed for a short time, and the rest are exposed for a long time. This also applies to the R pixels and the Gb pixels. Furthermore, the drive section 210 causes pixels with the same exposure time to be added.

As exemplified in FIG. 11B, a short storage frame 501 is generated by pixel addition. In FIG. 11B, "R(S)" indicates a pixel obtained by adding R1, R2, R7, and R8. "Gr(S)" indicates a pixel obtained by adding Gr1, Gr2, Gr9, and Gr10. "Gb(S)" indicates a pixel obtained by adding Gb1, Gb2, Gb9, and Gb10. "B(S)" indicates a pixel obtained by adding B1, B2, B7, and B8.

Furthermore, as exemplified in FIG. 11C, the long storage frame 502 is generated by pixel addition. In FIG. 11C, "R (L)" indicates a pixel obtained by adding R3 to R6. "Gr (L)" indicates a pixel obtained by adding Gr3 to Gr8. "Gb(L)" indicates a pixel obtained by adding Gb3 to Gb8. "B(L)" indicates a pixel obtained by adding B3 to B6.

The image processing section 253 can generate a frame with an expanded dynamic range by synthesizing the short storage frame 501 and the long storage frame 502 with different exposure times. Furthermore, the image processing section 253 can also perform phase difference AF by the drive section 210 performing the PDD reading described above.

FIGS. 12A and 12B are diagrams illustrating an example of addition targets when exposure is performed three times in the exposure ratio mode according to the first embodiment of the present technology. The longest exposure time is denoted by TL, the shortest exposure time is denoted by TS, and the intermediate exposure time is denoted by TM. In the figure, "(M)" indicates that the exposure time is TM.

As exemplified in FIG. 12A, in the deca-pixel block 300, for example, the drive section 210 causes four pixels to be exposed for the longest TL, four pixels to be exposed for the intermediate TM, and the remaining two pixels to be exposed for the shortest TS. Furthermore, in the octa-pixel block 350, for example, the drive section 210 causes four pixels to be exposed for the longest TL, two pixels to be exposed for the intermediate TM, and the remaining two pixels to be exposed for the shortest TS.

Alternatively, as exemplified in FIG. 12B, in the deca-pixel block 300, for example, the drive section 210 can cause four pixels to be exposed for the longest TL, two pixels to be exposed for the intermediate TM, and the remaining four pixels to be exposed for the shortest TS. The exposure time of the octa-pixel block 350 in FIG. 12B is similar to that in FIG. 12A.

FIG. 13 is a diagram illustrating an example of addition targets when exposure is performed four times in the exposure ratio mode according to the first embodiment of the present technology. The longest exposure time is denoted by $T_L$, the shortest exposure time is denoted by $T_S$, and the intermediate exposure times thereof are denoted by $T_M$, $T_m$. The exposure times for $T_M$ and $T_m$ are different. In the figure, "(m)" indicates that the exposure time is $T_m$.

As exemplified in the figure, in the deca-pixel block 300, for example, the drive section 210 causes four pixels to be exposed for the longest $T_L$, two pixels to be exposed for the intermediate $T_M$, two pixels to be exposed for the intermediate $T_m$, and the remaining two pixels to be exposed for the shortest $T_S$. Furthermore, in the octa-pixel block 350, for example, the drive section 210 causes two pixels to be exposed for the longest $T_L$, two pixels to be exposed for the intermediate $T_M$, two pixels to be exposed for the intermediate $T_m$, and the remaining two pixels to be exposed for the shortest $T_S$.

As exemplified in FIGS. 11A, 11B, 11C, 12A, 12B, and 13, in the exposure ratio mode, the solid-state imaging element 200 can set various number of exposures such as twice, three times, and four times. Note that the number of exposures and the arrangement of the addition targets in the exposure ratio mode are not limited to those exemplified in FIGS. 11A, 11B, 11C, 12A, 12B, and [to] 13.

Figure 14:
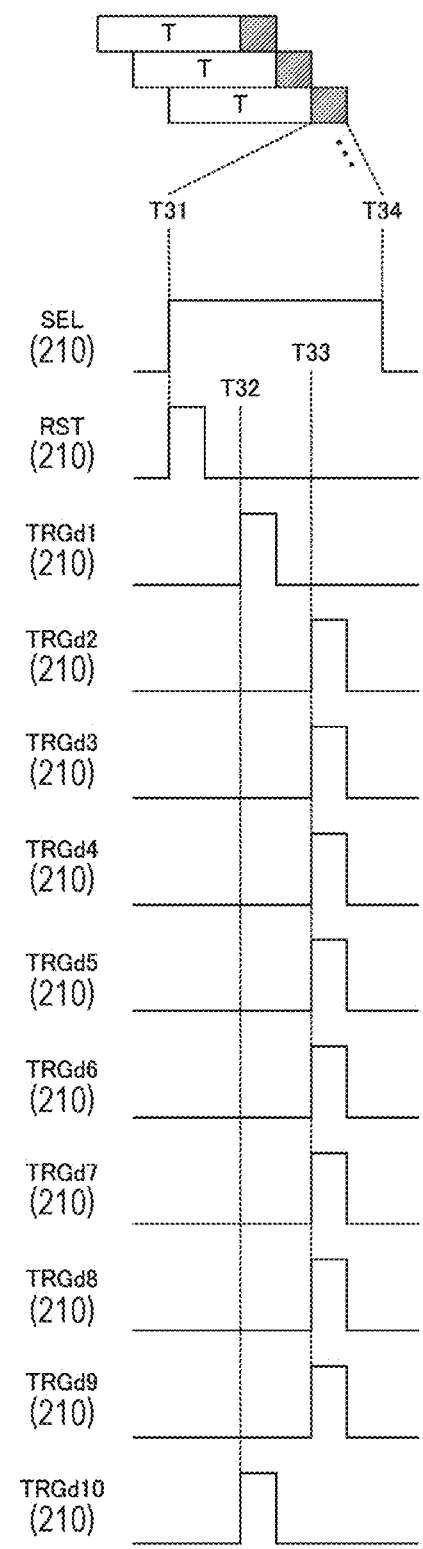
FIG. 14 is a timing chart illustrating an example of a driving method in a pixel addition ratio mode according to the first embodiment of the present technology.

FIG. 14 is a timing chart illustrating an example of a driving method in the pixel addition ratio mode according to the first embodiment of the present technology. In the deca-pixel block 300, the exposure of two pixels is simultaneously started, and the exposure of the remaining eight pixels is started immediately thereafter.

Then, at timing T31 immediately before the exposure time T elapses, the drive section 210 sets the selection signal SEL to the high level and sets the reset signal RST to the high level over a pulse period. As a result, the floating diffusion layer 342 in the deca-pixel block 300 is initialized. Then, at timing T32, the drive section 210 sets the transfer signals TRGd1, TRGd10 to the high level over a pulse period. As a result, charges are transferred from the two pixels, and the pixel signals of these pixels are added. Subsequently, at timing T33, the drive section 210 sets the transfer signals TRGd2 to TRGd9 to the high level over a pulse period. As a result, charges are transferred from the remaining eight pixels, and the pixel signals of these pixels are added. At timing T34, the drive section 210 sets the selection signal SEL to the low level.

The readout section 230 reads the P-phase level (reset level) immediately after timing T31, reads the D-phase level (signal level) immediately after timings T32, T33, and obtains a difference therebetween as a net signal level.

The driving method for the octa-pixel block 350 is similar to that of the deca-pixel block 300 except that two pixels are added and the remaining six pixels are added.

By the driving method exemplified in the figure, the pixel signals of the two pixels undergo pixel addition and are read as a pixel signal of a short storage frame. Then, pixel signals of the remaining six pixels with the same exposure time undergo pixel addition and are read as a pixel signal of a long storage frame. In the driving method in the figure, the image processing section 253 cannot perform phase difference AF, but phase difference AF can be performed by PDD reading depending on the positions of the pixels to be added.

FIGS. 15A and 15B are diagrams illustrating an example of addition targets in a case where phase difference AF cannot be performed in the pixel addition ratio mode according to the first embodiment of the present technology. In the figure, FIG. 15A illustrates an example of addition targets in a case where phase difference AF cannot be performed in the pixel addition ratio mode, and FIG. 15B illustrates another example in which the positions of the addition targets are changed.

As exemplified in FIG. 15A of the figure, the solid-state imaging element 200 can add the two pixels on the upper left and the lower right in the pixel block, and add the remaining pixels. In the deca-pixel block 300, Gr1 and Gr10 or another pair are added, and the remaining six pixels are added. In the octa-pixel block 350, B1 and B8 or another pair are added, and the remaining six pixels are added.

Alternatively, as exemplified in FIG. 15B of the figure, the solid-state imaging element 200 can add the two pixels in the second column of the first row and the third column of the third row within the pixel block, and add the remaining pixels.

In a case where the pixels at the positions exemplified in FIGS. 15A and 15B are added, since the pixel pair such as G1 and Gr10 is not the pixel pair adjacent in the horizontal direction, the image processing section 253 cannot perform phase difference AF. However, the exposure center of gravity can be made uniform between the long storage frame and the short storage frame.

FIGS. 16A and 16B are diagrams illustrating an example of addition targets in a case where phase difference AF can be performed in the pixel addition ratio mode according to the first embodiment of the present technology. In the figure, FIG. 16A illustrates an example of addition targets in a case where phase difference AF can be performed in the pixel addition ratio mode, and FIG. 16B illustrates another example in which the positions of the addition targets are changed.

As exemplified in FIG. 16A, the solid-state imaging element 200 can add the two pixels in the third row within the pixel block, and add the remaining pixels. In the deca-pixel block 300, Gr7 and Gr8 or another pair are added, and the remaining six pixels are added. In the octa-pixel block 350, B7 and B8 or another pair are added, and the remaining six pixels are added.

Alternatively, as exemplified in FIG. 16B, the solid-state imaging element 200 can add the two pixels at the central portion in the pixel block, and add the remaining pixels. In the deca-pixel block 300, Gr5 and Gr6 or another pair are added, and the remaining six pixels are added. In the octa-pixel block 350, B4 and B5 or another pair are added, and the remaining six pixels are added.

In a case where the pixels at the positions exemplified in FIGS. 16A and 16B of the figure are added, since the pixel pair such as Gr7 and Gr8 is the pixel pair adjacent in the horizontal direction, the image processing section 253 can perform phase difference AF by PDD reading. However, it is noted that in FIG. 16A, the center of gravity for exposure shifts between the long storage frame and the short storage frame.

Figures 17, 18:
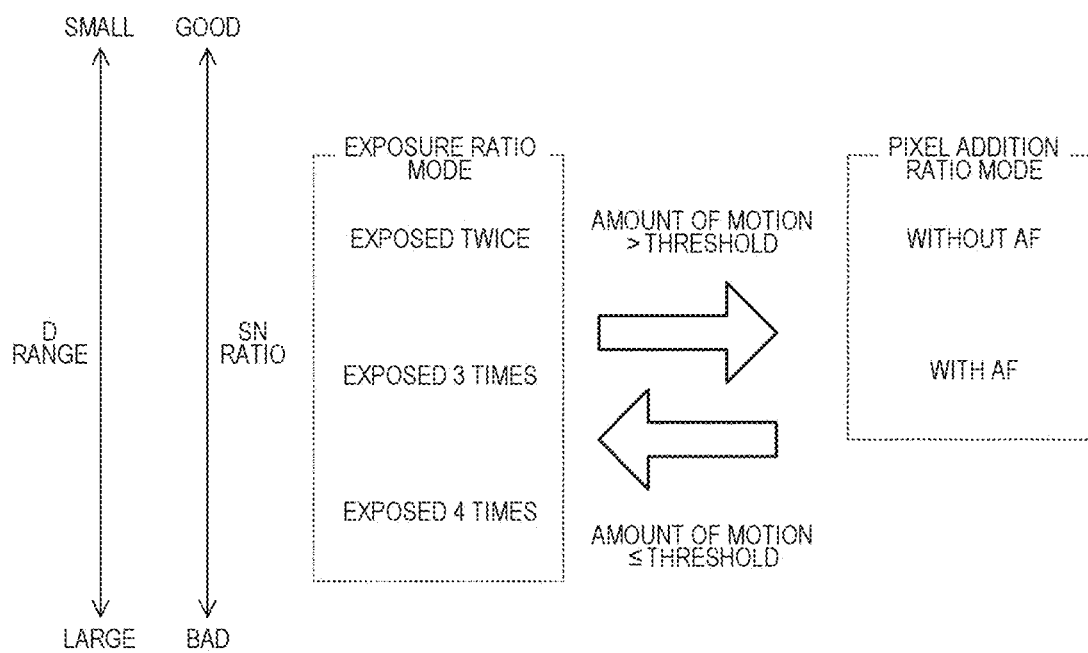
FIG. 17 is a diagram for explaining a method for setting the imaging mode according to the first embodiment of the present technology.
FIG. 18 is a diagram for explaining a method for setting a gain in the exposure ratio mode according to the first embodiment of the present technology.

FIG. 17 is a diagram for explaining a method for setting the imaging mode according to the first embodiment of the present technology. As described above, for example, in a case where the amount of motion is larger than the threshold, the solid-state imaging element 200 sets the pixel addition ratio mode, and otherwise, the solid-state imaging element 200 sets the exposure ratio mode.

In the exposure ratio mode, the number of exposures is set to any one of 2, 3, and 4. The larger the number of exposures, the grater the dynamic range. On the other hand, the larger the number of exposures, the smaller the number of pixels added, and hence the signal-noise (SN) ratio deteriorates. The number of exposures is set in consideration of the balance between the dynamic range and the SN ratio. Furthermore, in the pixel addition ratio mode, whether or not to perform phase difference AF can be set.

FIG. 18 is a diagram for explaining a method for setting a gain in the exposure ratio mode according to the first embodiment of the present technology. The number of exposures is set to 2. The number of added R pixels and added B pixels with the longer exposure time is 4 each, and the number of added G pixels with the longer exposure time is six. The number of added R pixels and added B pixels with the shorter exposure time is 4 each, and the number of added G pixels with the shorter exposure time is 4.

Furthermore, since the octa-pixel block 350 in which the R pixels or the B pixels are arranged has a larger parasitic capacitance than the deca-pixel block 300 in which the G pixels are arranged, the charge-voltage conversion efficiency is reduced accordingly. For example, in a case where the charge-voltage conversion efficiency when the floating diffusion layer is not shared by a plurality of pixels is set to "100", the charge-voltage conversion efficiency corresponding to the R pixel or the B pixel when the floating diffusion layer is shared is set to "71.8". Furthermore, the charge-voltage conversion efficiency corresponding to the G pixel is set to "67.0".

In each of the long storage frame and the short storage frame, the gain is set so that the sensitivity of the pixel is equalized. In a case where the gain for the pixel signal of the G pixel with the longer exposure time is "1.000", the gain for the pixel signal of the R pixel or the B pixel with the longer exposure time is obtained by, for example, the following expression.

$$(67.0 \times 6)/(71.8 \times 4) \approx 1.400 \qquad \text{Expression 1}$$

The gain for the pixel signal of the R pixel or the B pixel with the shorter exposure time is also "1.400" according to a calculation expression similar to Expression 1.

Furthermore, the gain for the pixel signal of the G pixel with the shorter exposure time is obtained, for example, by the following expression.

$$(67.0 \times 6)/(67.6 \times 4) = 1.500 \qquad \text{Expression 2}$$

Note that the gains obtained by Expressions 1 and 2 are values not converted into decibels.

Figure 19A:
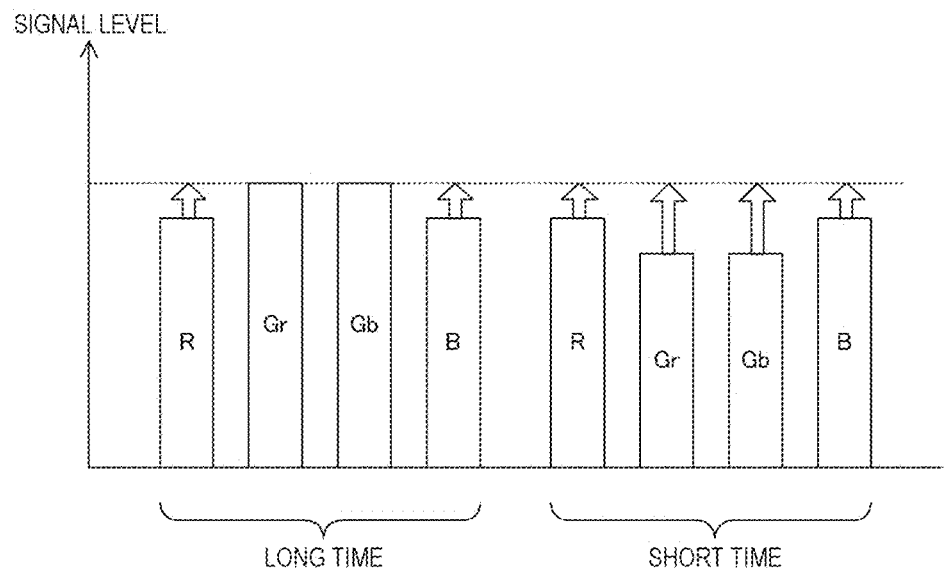
FIGS. 19A and 19B are diagrams illustrating an example of signal levels before and after amplification in the exposure ratio mode according to the first embodiment of the present technology.
Figure 19B:
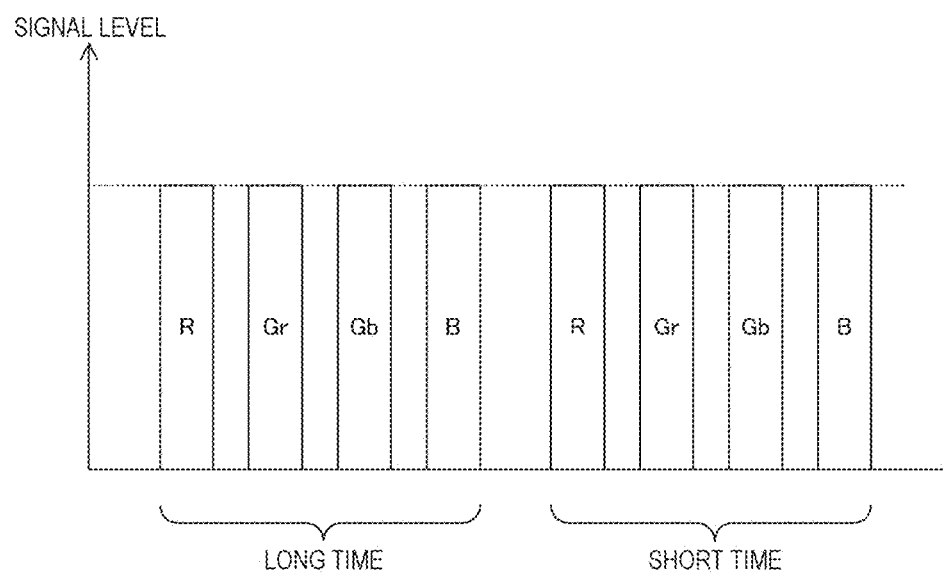

FIGS. 19A and 19B are diagrams illustrating an example of signal levels before and after amplification in the exposure ratio mode according to the first embodiment of the present technology. In the figure, FIG. 19A illustrates an example of a signal level of each pixel before amplification in the exposure ratio mode. In the figure, FIG. 19B illustrates an example of a signal level of each pixel after amplification in the exposure ratio mode.

The amount of light received per unit time of each of the R, Gr, Gb, and B pixels is the same. As exemplified in FIG. 19A, due to the difference in the charge-voltage conversion efficiency and the number of pixels added, the signal levels of the R pixel and the B pixel with a longer exposure time are lower than those of the Gr pixel and the Gb pixel with a longer exposure time.

Furthermore, due to the difference in at least one of the charge-voltage conversion efficiency and the number of pixels added, the respective signal levels of the R pixel, the G pixel, and the B pixel with a short exposure time is lower than those of the Gr pixel and the Gb pixel with a long exposure time. That is, before amplification, there is a difference in sensitivity between the R pixel and the G pixel and between the B pixel and G pixel.

Therefore, the readout section 230 amplifies the pixel signal of each of the R pixel, the G pixel, and the B pixel with the gain obtained by Expression 1 or Expression 2.

This allows the output level of each pixel to be the same when the amount of light received per unit time is the same, as exemplified in FIG. 19B. That is, the sensitivity can be made uniform.

Note that, in the figure, the ratio of exposure time between long and short storage frames is set to 1:1 for convenience of explanation, but in actual imaging, the ratio is set to a value different from 1:1.

FIG. 20 is a diagram for explaining a gain setting method in the pixel addition ratio mode according to the first embodiment of the present technology. The number of added R pixels and added B pixels corresponding to the long storage frame is six each, and the number of added G pixels corresponding to the long storage frame is 8. The number of added R pixels and added B pixels corresponding to the short storage frame is 2 each, and the number of added G pixels corresponding to the short storage frame is 2.

The charge-voltage conversion efficiency corresponding to the R pixel or the B pixel is set to "71.8". Furthermore, the charge-voltage conversion efficiency corresponding to the G pixel is set to "67.0".

In each of the long storage frame and the short storage frame after amplification, the gain is set so that the sensitivities of the respective pixels are equalized. For example, in a case where the gain for the pixel signal of the G pixel corresponding to the long storage frame is "1.000", the gain for the pixel signal of the R pixel or the B pixel corresponding to the long storage frame is obtained by, for example, the following expression.

$$(67.0 \times 8)/(71.8 \times 6) \approx 1.244 \qquad \text{Expression 3}$$

Furthermore, in a case where the gain for the pixel signal of the R pixel or the B pixel corresponding to the short storage frame is "1.000", the gain for the pixel signal of the G pixel corresponding to the short storage frame is obtained, for example, by the following expression.

$$(67.0 \times 2)/(71.8 \times 2) \approx 1.072 \qquad \text{Expression 4}$$

Note that the gains obtained by Expressions 3 and 4 are values not converted into decibels.

As exemplified in Expressions 1 to 4, the gain for the pixel signal is set on the basis of the ratio of the charge-voltage conversion efficiency and the ratio of the number of pixels added for each of the deca-pixel block 300 and the octa-pixel block 350. The ADC 232 and the column amplifier 239 amplify the pixel signal by the gain. Note that the ADC 232 or the column amplifier 239 is an example of an amplifier circuit recited in the claims.

Figure 21A:
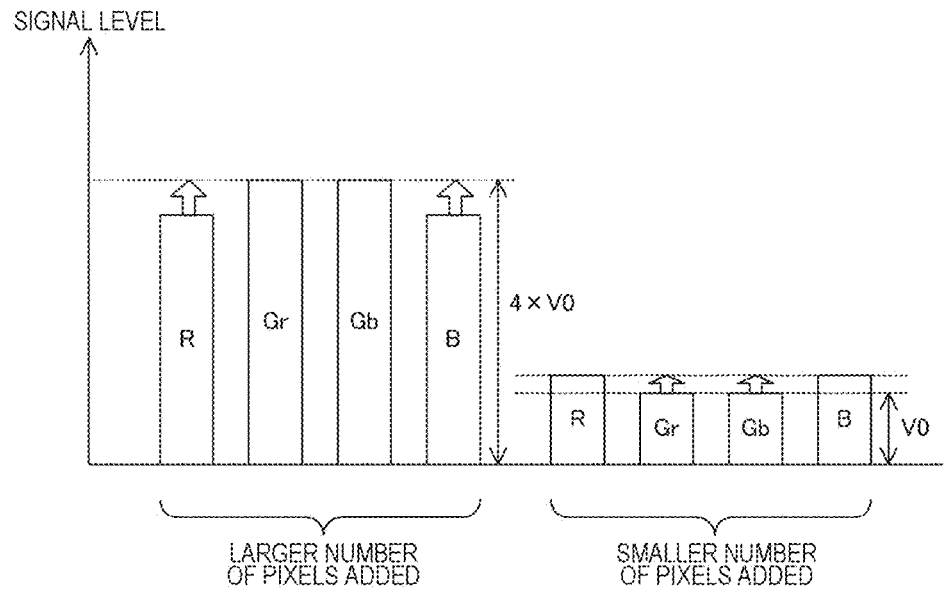
FIGS. 21A and 21B are diagrams illustrating an example of signal levels before and after amplification in the pixel addition ratio mode according to the first embodiment of the present technology.
Figure 21B:
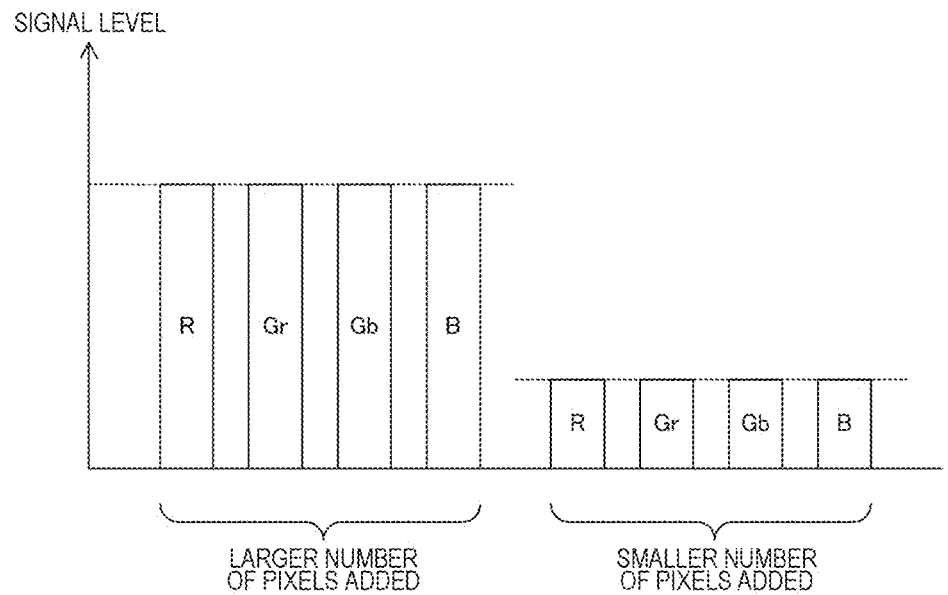

FIGS. 21A and 21B are diagrams illustrating an example of signal levels before and after amplification in the pixel addition ratio mode according to the first embodiment of the present technology. In the figure, FIG. 21A illustrates an example of a signal level of each pixel before amplification in the pixel addition ratio mode. In the figure, FIG. 21B illustrates an example of a signal level of each pixel after amplification in the pixel addition ratio mode.

The amount of light received per unit time of each of the R, Gr, Gb, and B pixels is the same. As exemplified in FIG. 21A, due to the difference in the charge-voltage conversion efficiency and the number of pixels added, the signal levels of the R pixel and the B pixel are lower than those of the Gr pixel and the Gb pixel in the long storage frame with a larger number of pixels added. Furthermore, the signal levels of the R pixel and the B pixel are higher than those of the Gr pixel and the Gb pixel in a short storage frame with a smaller number of pixels added.

In the long storage frame, the output levels of the R pixel and the B pixel are lower than those of the G pixel. Furthermore, in the short storage frame, the output levels of the R pixel and the B pixel are higher than those of the G pixel. The ratio between the output level (4×V0, etc.) of the G pixel in the long storage frame and the output level (V0, etc.) of the G pixel in the short storage frame is equal to the ratio of the number of pixels added (4:1, etc.). This also applies to the R pixels and the B pixels.

Therefore, the readout section 230 amplifies the pixel signal of each of the R pixel, the G pixel, and the B pixel with the gain obtained by Expression 3 or Expression 4. As a result, as exemplified in FIG. 21B, the sensitivities can be made uniform.

Operation Example of Imaging Device

Figure 22:
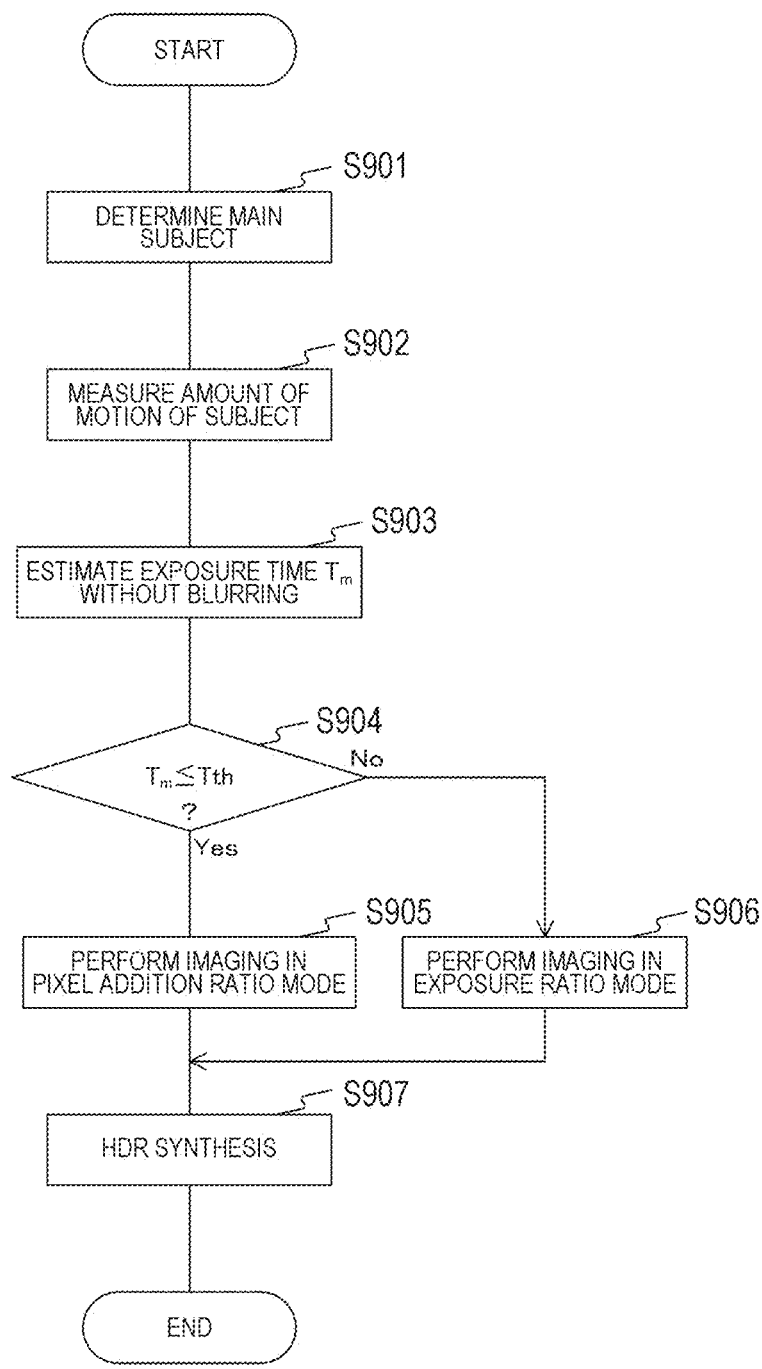
FIG. 22 is a flowchart illustrating an example of the operation of the imaging device according to the first embodiment of the present technology.

FIG. 22 is a flowchart illustrating an example of the operation of the imaging device 100 according to the first embodiment of the present technology. This operation is started, for example, when the HDR mode is set.

The imaging device 100 analyzes the image data (frame), determines a main subject (step S901), and measures the amount of motion (step S902). For example, the amount of motion is measured by the background subtraction method or the frame-to-frame difference method.

The imaging device 100 estimates the longest exposure time $T_m$ in which no blurring occurs on the basis of the amount of motion and various imaging parameters (step S903), and determines whether or not $T_m$ is equal to or shorter than Tth (step S904).

In a case where $T_m$ is equal to or shorter than Tth (step S904: Yes), the imaging device 100 performs imaging in the pixel addition ratio mode (step S905). On the other hand, in a case where $T_m$ is longer than Tth (step S904: No), the imaging device 100 performs imaging in the exposure ratio mode (step S906).

In an imaging scene where the amount of motion of the subject is large (i.e., the exposure time $T_m$ is short), when the exposure ratio mode is set, blurring may occur in the long storage frame. Therefore, it is desirable to set the pixel addition ratio mode. On the other hand, in the pixel addition ratio mode, although blurring hardly occurs, it is difficult to expand the dynamic range compared to the exposure ratio mode, and hence it is desirable to set the exposure ratio mode in a case where the amount of motion of the subject is small. As described above, by switching the mode in accordance with the imaging scene, it is possible to achieve both suppression of blurring and expansion of the dynamic range, thereby improving image quality.

After step S905 or S906, the imaging device 100 performs HDR synthesis processing (step S907), and ends the operation for imaging.

Note that, in a case where a plurality of images is continuously captured, steps S901 to S907 are repeatedly executed in synchronization with the vertical synchronization signal.

Furthermore, the imaging device 100 sets either the pixel addition ratio mode or the exposure ratio mode on the basis of the comparison result between $T_m$ and Tth obtained from the amount of motion, but the present technology is not limited to this setting method. The imaging device 100 can also set either the pixel addition ratio mode or the exposure ratio mode on the basis of the comparison result between the amount of motion and the predetermined value without obtaining $T_m$.

FIG. 23 is a diagram illustrating an example of setting the imaging mode according to the first embodiment of the present technology. In the normal mode, the number of G pixels added is 10, and the number of R pixels added and the number of B pixels added are 8 each. Furthermore, phase difference AF is possible, and a frame rate is 60 fps (frame per second).

In the exposure ratio mode, in a case where the number of exposures is 2, the number of G pixels added is 6-4, and the number of R pixels added and the number of B pixels added are 4-4 each. Furthermore, phase difference AF can be performed, and the output ratio (i.e., the ratio of the number of pixels added) by pixel addition is 1.5:1 for the G pixels. The output ratio of each of the R pixels and the B pixels is 1:1. Furthermore, the ratio of the exposure times is, for example, 1:4, and the frame rate is 30 fps.

In the exposure ratio mode, in a case where the number of exposures is 3, the number of G pixels added is 4-4-2, and the number of R pixels added and the number of B pixels added are 4-2-2 each. Phase difference AF is thus possible. The output ratio of the G pixels is 2:2:1, and the output ratio of each of the R pixel and the B pixel is 2:1:1. Furthermore, the ratio of the exposure times is, for example, 1:4:16, and the frame rate is 20 fps.

In the pixel addition ratio mode, the number of G pixels added is 8-2, and the number of R pixels added and the number of B pixels added are 6-2 each. Depending on the positions of the addition targets, phase difference AF may be possible or impossible. The output ratio of the G pixels is 4:1, and the output ratio of each of the R pixel and the B pixel is 3:1. Furthermore, the ratio of the exposure times is 1:1, and the frame rate is 30 fps.

As described above, according to the first embodiment of the present technology, the mode setting section 252 sets either the pixel addition ratio mode or the exposure ratio mode on the basis of the parameter such as the amount of motion, and hence it is possible to expand the dynamic range while suppressing image blurring. As a result, the image quality of the image data (frame) can be improved.

2. Second Embodiment

Figure 24:
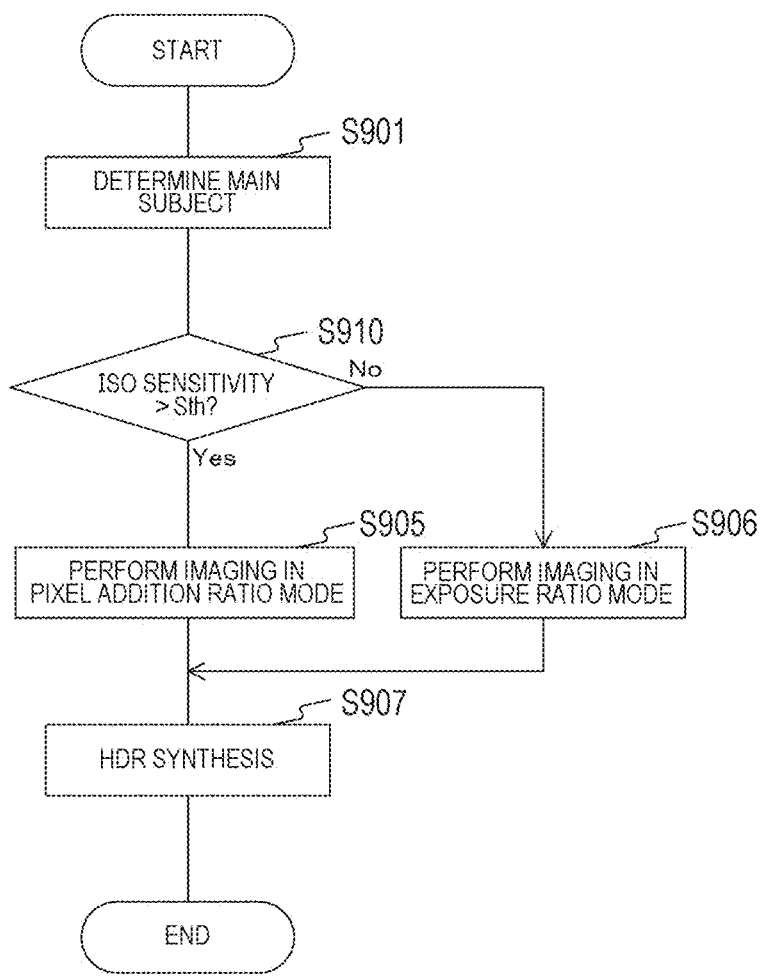
FIG. 24 is a flowchart illustrating an example of the operation of an imaging device according to a second embodiment of the present technology.

In the first embodiment described above, the mode setting section 252 has set the mode on the basis of the exposure time $T_m$ obtained from the amount of motion, but the mode can also be set on the basis of imaging parameters other than the amount of motion and the exposure time $T_m$. The mode setting section 252 in a second embodiment differs from that in the first embodiment in that the mode is switched on the basis of the ISO sensitivity. FIG. 24 is a flowchart illustrating an example of the operation of the imaging device 100 according to the second embodiment of the present technology.

The imaging device 100 determines a main subject (step S901), and determines whether or not the current ISO sensitivity is higher than a predetermined value Sth (step S910). In a case where the ISO sensitivity is higher than Sth (step S910: Yes), the imaging device 100 performs imaging in the pixel addition ratio mode (step S905). On the other hand, in a case where the ISO sensitivity is Sth or lower (step S910: No), the imaging device 100 performs imaging in the exposure ratio mode (step S906). After step S905 or S906, the imaging device 100 performs HDR synthesis processing (step S907).

In a case where the ISO sensitivity is higher than Sth, the imaging scene is often a dark place. In this case, in order to sufficiently increase the sensitivity, it is desirable to set a pixel addition ratio mode in which the number of pixels added can be made larger (i.e., the sensitivity is high.) than in the exposure ratio mode. On the other hand, in the pixel addition ratio mode, although the number of pixels added can be increased, it is difficult to expand the dynamic range compared to the exposure ratio mode, and hence the exposure ratio mode is desirably set in the case of a blight place. By switching the mode according to the imaging scene in this manner, it is possible to improve both the sensitivity and the dynamic range, thereby improving the image quality.

Note that the configuration is not limited to the configuration using only the ISO sensitivity, and the mode setting section 252 can set the mode using a plurality of parameters including the ISO sensitivity.

As described above, according to the first embodiment of the present technology, since the mode setting section 252 sets either the pixel addition ratio mode or the exposure ratio mode on the basis of the ISO sensitivity, it is possible to expand the dynamic range while securing the sensitivity. This can lead to an improvement in image quality.

3. Third Embodiment

In the first embodiment described above, the deca-pixel block 300 and the octa-pixel block 350 have been arranged in the pixel array section 220, but other pixel blocks may be arranged in the pixel array section 220. The pixel array section 220 of the third embodiment differs from that of the first embodiment in that a pixel block including nine pixels is arranged.

Figure 25:
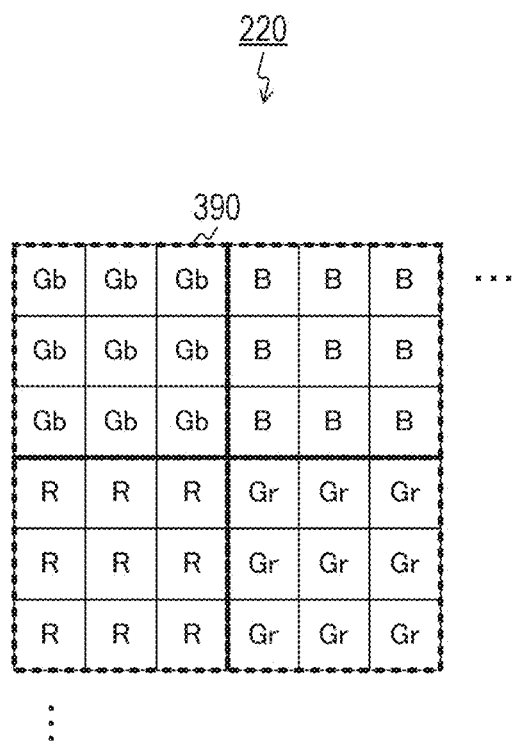
FIG. 25 is an example of a plan view of a pixel array section according to a third embodiment of the present technology.

FIG. 25 is an example of a plan view of the pixel array section 220 according to the third embodiment of the present technology. The pixel array section 220 of the third embodiment differs from that of the first embodiment in that a nona-pixel block 390 is arranged instead of the deca-pixel block 300 and the octa-pixel block 350.

In the nona-pixel block 390, nine pixels of the same color in 3 rows×3 columns sharing the floating diffusion layer are arranged. In the horizontal direction, a nona-pixel block 390 including Gb pixels and a nona-pixel block 390 including B pixels are alternately arrayed. In addition, in the horizontal direction, a nona-pixel block 390 including Gr pixels and a nona-pixel block 390 including R pixels are alternately arrayed. The circuit configuration of the nona-pixel block 390 is similar to the circuit configurations exemplified in FIGS. 3 and 4 except that the number of pixels differs.

FIGS. 26A and 26B are diagrams illustrating an example of addition targets in the exposure ratio mode according to the third embodiment of the present technology. In the figure, FIG. 26A illustrates an example of pixels with a shorter exposure time, and FIG. 26B illustrates an example of pixels with a longer exposure time.

As exemplified in FIG. 26A, in the exposure ratio mode, the imaging device 100 captures an image of a frame in a shorter exposure time. At the time of this imaging, the drive section 210 causes nine pixels in each of the nona-pixel blocks 390 to be added. As a result, a short storage frame in the Bayer array is generated.

Furthermore, as exemplified in FIG. 26B, the imaging device 100 captures an image of a frame with a longer exposure time. At the time of this imaging, the drive section 210 causes nine pixels in each of the nona-pixel blocks 390 to be added. As a result, a long storage frame in the Bayer array is generated. The long storage frame is synthesized with the short storage frame in HDR.

Note that, although the imaging device 100 performs pixel addition in the exposure ratio mode, it is also possible to read all the pixels without pixel addition and then perform HDR synthesis processing.

FIG. 27 is a diagram illustrating an example of addition targets in the exposure ratio mode according to the third embodiment of the present technology. As exemplified in the figure, in the pixel addition ratio mode, the drive section 210 causes eight pixels around the central portion in the block to be added for each nona-pixel block 390. As a result, a long storage frame is generated. Furthermore, for each nona-pixel block 390, a frame with one pixel in the central portion is output as a short storage frame, and is synthesized with the long storage frame in HDR.

FIG. 28 is a diagram for explaining a gain setting method in the pixel addition ratio mode according to the third embodiment of the present technology. The number of added R pixels, G pixels, and B pixels corresponding to the long storage frame is 8 each. The number of added R pixels, G pixels, and B pixels corresponding to the short storage frame is 1 each. In the third embodiment, since the circuit configurations of the pixel blocks in which the R pixel, the G pixel, and the B pixel are arranged, respectively, are the same, the charge-voltage conversion efficiency is the same. Therefore, the same value (1.000, etc.) is set as the gain for each pixel signal.

Note that, in the exposure ratio mode as well, since the charge-voltage conversion efficiency and the number of pixels added are the same among the R pixel, the G pixel, and B pixel, the same value is set to the gain for the pixel signal of each pixel.

Figure 29:
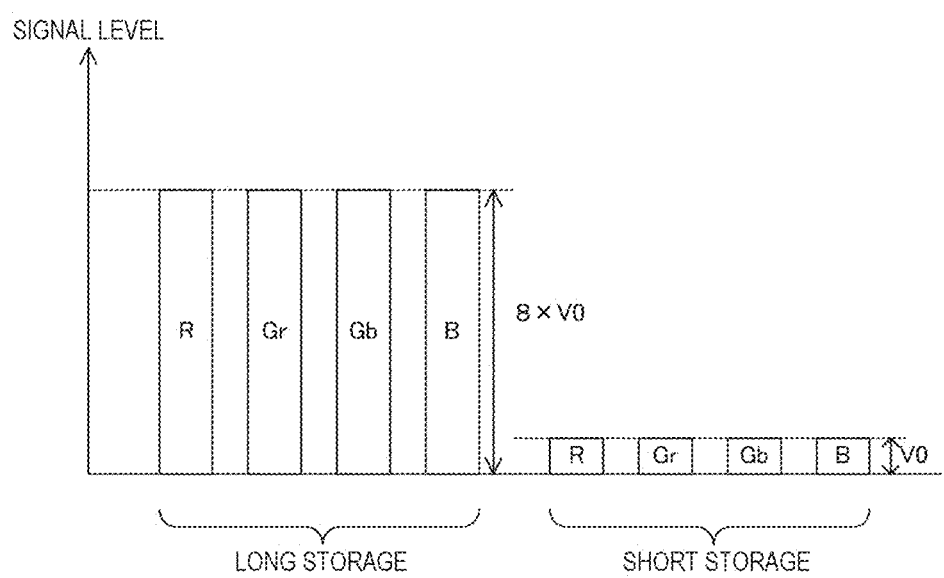
FIG. 29 is a diagram illustrating an example of a signal level in the pixel addition ratio mode according to the third embodiment of the present technology.

FIG. 29 is a diagram illustrating an example of a signal level in the pixel addition ratio mode according to the third embodiment of the present technology. Since the charge-voltage conversion efficiency of each of the R pixel, the G pixel, and the B pixel is the same in both the long storage frame and the short storage frame, the output levels thereof are the same. Since the sensitivity is uniform, the gain for each of the pixel signals of the R pixel, the G pixel, and the B pixel may be the same. In addition, the ratio between the output level (8×V0, etc.) of the pixels in the long storage frame and the output level (V0, etc.) of the pixels in the short storage frame is equal to the ratio of the number of pixels added (4:1, etc.).

Note that, also in the exposure ratio mode, the sensitivity of each of the R pixel, the G pixel, and the B pixel may be the same, and the gain for each pixel signal may be the same.

Furthermore, the second embodiment can also be applied to the third embodiment.

As described above, according to the third embodiment of the present technology, since the pixel blocks each including nine pixels are arranged, it is not necessary to adjust the gain for the pixel signal of each of the R pixel, the G pixel, and the B pixel in order to make the sensitivity uniform.

4. Example of Application to Mobile Object

The technology according to the present disclosure (the present technology) can be applied to various products. For example, the technology according to the present disclosure may be implemented as a device mounted on any type of mobile object such as an automobile, an electric vehicle, a hybrid electric vehicle, a motorcycle, a bicycle, a personal mobility, an airplane, a drone, a ship, or a robot.

Figure 30:
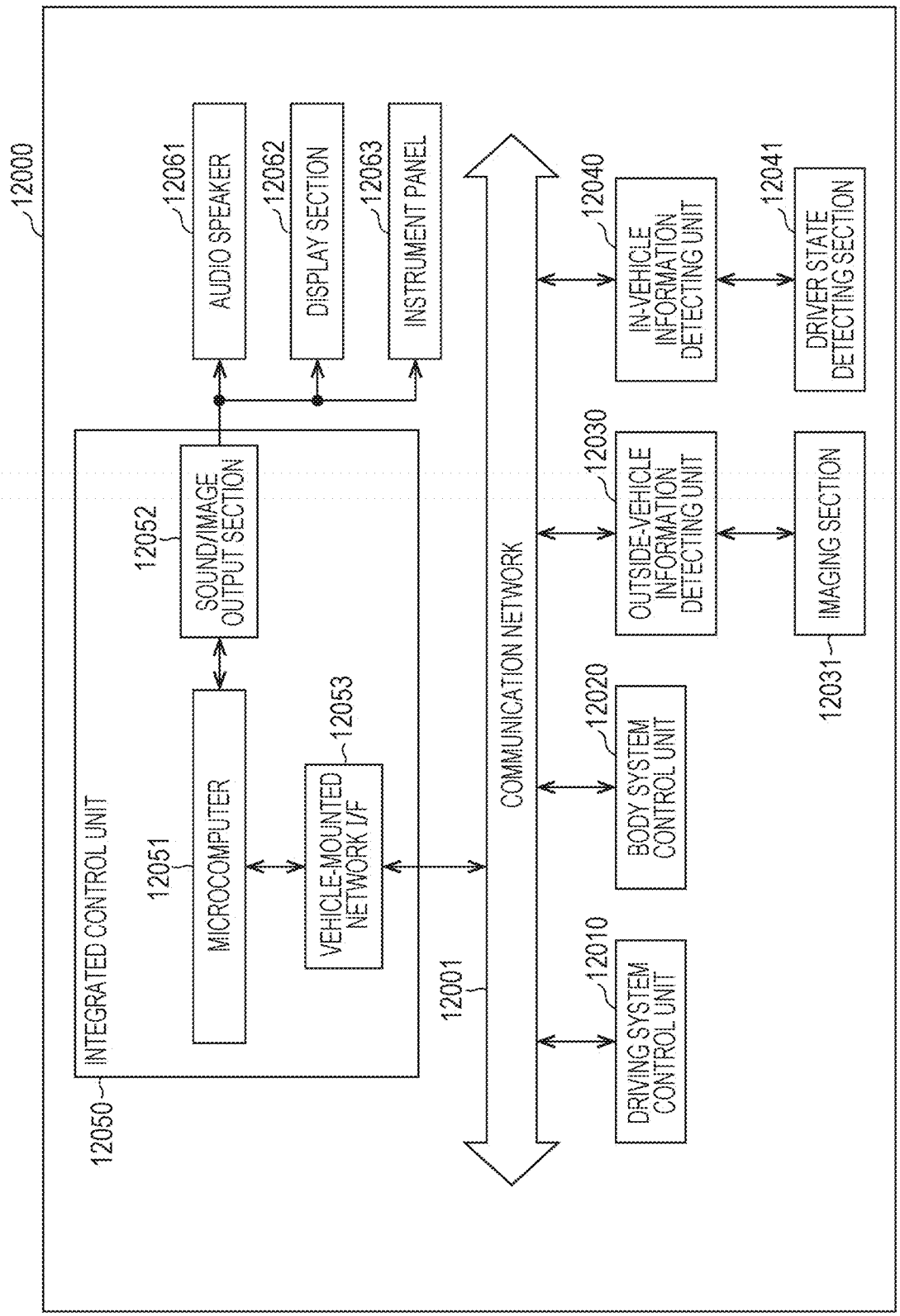
FIG. 30 is a block diagram illustrating a schematic configuration example of a vehicle control system.

FIG. 30 is a block diagram illustrating a schematic configuration example of a vehicle control system as an example of a mobile object control system to which the technology according to the present disclosure may be applied.

The vehicle control system 12000 includes a plurality of electronic control units connected to each other via a communication network 12001. In the example illustrated in FIG. 30, the vehicle control system 12000 includes a driving system control unit 12010, a body system control unit 12020, an outside-vehicle information detecting unit 12030, an in-vehicle information detecting unit 12040, and an integrated control unit 12050. Furthermore, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 30, an audio speaker 12061, a display section 12062, and an instrument panel 12063 are exemplified as the output device. The display section 12062 may, for example, include at least one of an on-board display and a head-up display.

Figure 31:
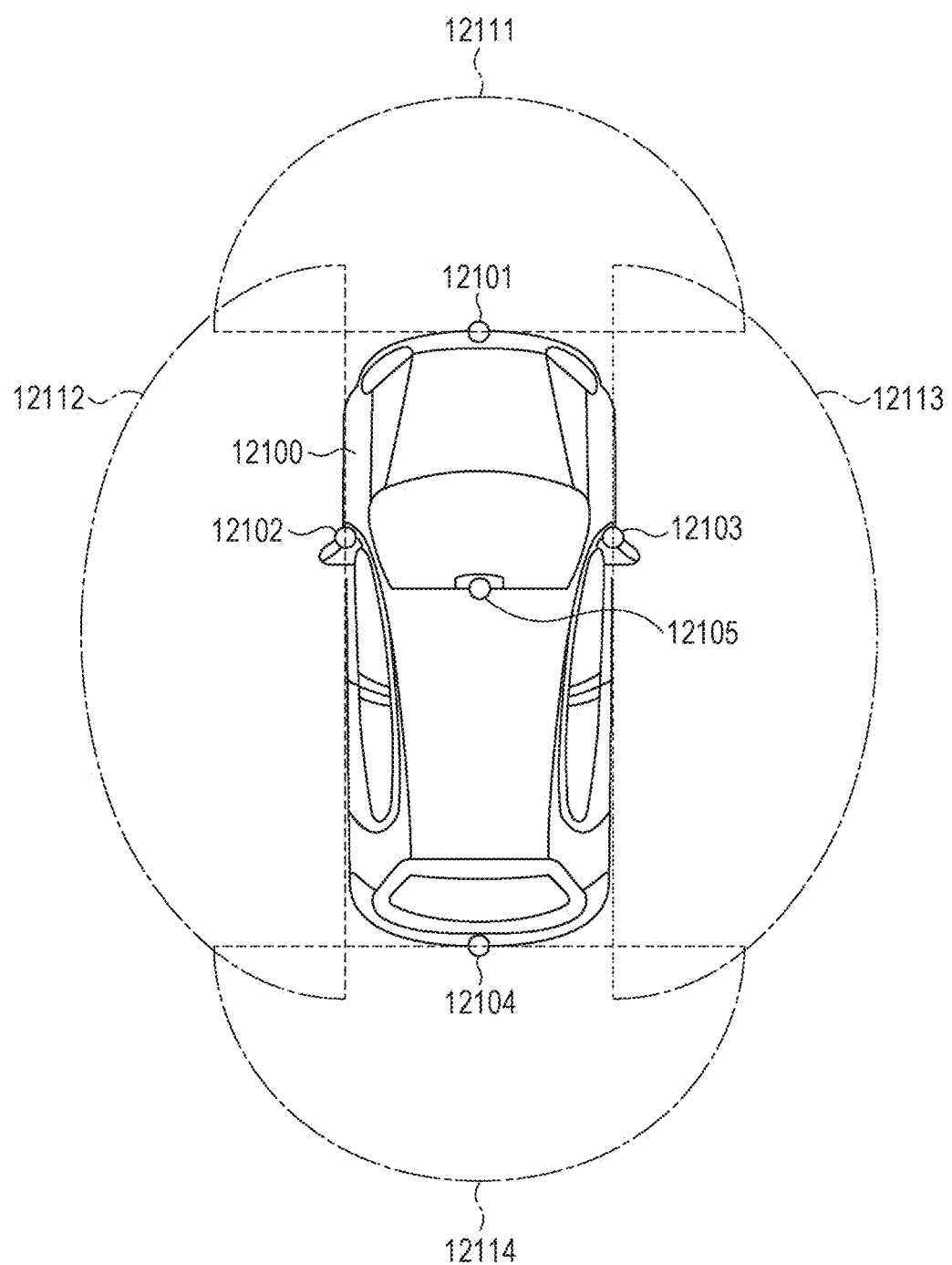
FIG. 31 is an explanatory diagram illustrating an example of an installation position of an imaging section.

FIG. 31 is a diagram illustrating an example of the installation position of the imaging section 12031.

In FIG. 31, the imaging section 12031 includes imaging sections 12101, 12102, 12103, 12104, 12105.

The imaging sections 12101, 12102, 12103, 12104, 12105 are, for example, disposed at positions on the front nose, sideview mirrors, rear bumper, and back door of the vehicle 12100 as well as a position on the upper portion of a windshield in the interior of the vehicle. The imaging section 12101 provided to the front nose and the imaging section 12105 provided to the upper portion of the windshield within the interior of the vehicle obtain mainly an image of the front of the vehicle 12100. The imaging sections 12102, 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 31 illustrates an example of the imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied, for example, to the imaging section 12031 among the configurations described above. Specifically, the imaging device 100 in FIG. 1 can be applied to the imaging section 12031. By applying the technology according to an embodiment of the present disclosure to the imaging section 12031, the dynamic range can be expanded, and a more easily viewable captured image can be obtained, thus enabling a reduction in driver's fatigue.

Note that the embodiments described above show examples for embodying the present technology, and the matters in the embodiments and the matters specifying the invention in the claims have corresponding relationships, respectively. Similarly, the matters specifying the invention in the claims and matters with the same names in the embodiments of the present technology have correspondence relationships, respectively. However, the present technology is not limited to the embodiments, and can be embodied by applying various modifications to the embodiments without departing from the gist of the present technology.

Note that effects described in the present specification are merely examples and are not limited, and other effects may be provided.

Note that the present technology may also have the following configuration.

(1) A solid-state imaging element including:
a drive section that causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set; and
a mode setting section that sets one of the pixel addition ratio mode and the exposure ratio mode on the basis of a predetermined parameter related to an imaging scene.

(2) The solid-state imaging element according to (1) above, further including
a pixel array section that includes a predetermined number of pixel blocks in which a plurality of pixels sharing a floating diffusion layer is arranged, in which
in a case where the exposure ratio mode is set, the drive section drives a pixel at a predetermined position in the pixel block as each of the first pixels, and drives a pixel at a position different from the predetermined position in the pixel block as each of the second pixels.

(3) The solid-state imaging element according to (2) above, in which
in each of the pixel blocks, nine pixels are arranged, and
in a case where the pixel addition ratio mode is set, the drive section causes a pixel signal of a central pixel in the pixel block to be generated as a pixel signal of the third pixel, and causes a signal, obtained by adding pixel signals of eight pixels around the central pixel, to be generated as a pixel signal of the fourth pixel.

(4) The solid-state imaging element according to (2) above, in which
the pixel block includes
a deca-pixel block in which ten pixels are arranged, and
an octa-pixel block in which eight pixels are arranged.

(5) The solid-state imaging element according to (4) above, in which
in a case where the exposure ratio mode is set, the drive section causes pixel signals of the first pixels to be added and then causes pixel signals of the second pixels to be added, and in a case where the pixel addition ratio mode is set, the drive section causes a signal, obtained by adding pixel signals of a partial area in the pixel block to be generated as a pixel signal of the third pixel and causes a signal, obtained by adding pixel signals of a remaining area in the pixel block to be generated as a pixel signal of the fourth pixel, and
the number of pixels added in the partial area differs from the number of pixels added in the remaining area.

(6) The solid-state imaging element according to (4) or (5) above, further including
an image processing section that processes the pixel signal, in which
a pair of pixels adjacent to each other in the pixel block share a microlens, and
the image processing section performs processing of acquiring a phase difference from respective pixel signals of the pair of pixels.

(7) The solid-state imaging element according to any one of (4) to (6) above, further including
an amplifier circuit that amplifies a pixel signal in at least one of the deca-pixel block or the octa-pixel block with a gain set on the basis of a ratio of charge-voltage conversion efficiency of each of the deca-pixel block and the octa-pixel block and a ratio of the number of pixels added.

(8) The solid-state imaging element according to any one of (1) to (7) above, in which
the parameter includes at least one of an amount of motion of a subject, a shutter speed, or a frame rate.

(9) The solid-state imaging element according to any one of (1) to (8) above, in which
the parameter includes international organization for standardization (ISO) sensitivity.

(10) An imaging device including:
a drive section that causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set;

a mode setting section that sets one of the pixel addition ratio mode and the exposure ratio mode on the basis of a predetermined parameter related to an imaging scene; and an image processing section that processes the image data read from the drive section.

(11) A method for controlling a solid-state imaging element, the method including:

a drive step of causing each of first pixels and each of second pixels to be exposed over different exposure times in a case where a predetermined exposure ratio mode is set, and making a value of a sensitivity of a third pixel different from a value of a sensitivity of a fourth pixel by pixel addition in a case where a predetermined pixel addition ratio mode is set; and a mode setting step of setting one of the pixel addition ratio mode and the exposure ratio mode on the basis of a predetermined parameter related to an imaging scene.

REFERENCE SIGNS LIST

100 Imaging device
110 Control section
120 Recording section
200 Solid-state imaging element
210 Drive section
220 Pixel array section
221, 221-1, 221-2 Pixel
222 Microlens
230 Readout section
231 Load current source
232 ADC
233, 234 Capacitor
235 Comparator
236 Counter
237 Latch circuit
238 Transfer control section
239 Column amplifier
240 Reference signal generation section
250 Signal processing section
251 Frame buffer
252 Mode setting section
253 Image processing section
260 Timing control section
300 Deca-pixel block
311 to 320, 361 to 368 Photoelectric conversion element
321 to 330, 371 to 378 Transfer transistor
341, 381 Reset transistor
342, 382 Floating diffusion layer
343, 383 Amplification transistor
344, 384 Selection transistor
350 Octa-pixel block
390 Nona-pixel block
12031 Imaging section

The invention claimed is:

1. A solid-state imaging element, comprising:
a drive section that causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set; and
a mode setting section that sets one of the predetermined pixel addition ratio mode and the predetermined exposure ratio mode on the basis of a predetermined parameter related to an imaging scene.

2. The solid-state imaging element according to claim 1, further comprising
a pixel array section that includes a predetermined number of pixel blocks in which a plurality of pixels sharing a floating diffusion layer is arranged, wherein
in a case where the predetermined exposure ratio mode is set, the drive section drives a pixel at a predetermined position in a pixel block of the predetermined number of pixel blocks as the each of the first pixels, and drives a pixel at a position different from the predetermined position in the pixel block as the each of the second pixels.

3. The solid-state imaging element according to claim 2, wherein
in each of the predetermined number of pixel blocks, nine pixels are arranged, and
in a case where the predetermined pixel addition ratio mode is set, the drive section causes a pixel signal of a central pixel in the pixel block to be generated as a pixel signal of the third pixel, and causes a signal, obtained by adding pixel signals of eight pixels around the central pixel, to be generated as a pixel signal of the fourth pixel.

4. The solid-state imaging element according to claim 2, wherein
the pixel block includes
a deca-pixel block in which ten pixels are arranged, and
an octa-pixel block in which eight pixels are arranged.

5. The solid-state imaging element according to claim 4, wherein
in a case where the predetermined exposure ratio mode is set, the drive section causes pixel signals of the first pixels to be added and then causes pixel signals of the second pixels to be added, and in a case where the predetermined pixel addition ratio mode is set, the drive section causes a signal, obtained by adding pixel signals of a partial area in the pixel block to be generated as a pixel signal of the third pixel and causes a signal, obtained by adding pixel signals of a remaining area in the pixel block to be generated as a pixel signal of the fourth pixel, and
a number of pixels added in the partial area differs from a number of pixels added in the remaining area.

6. The solid-state imaging element according to claim 4, further comprising
an image processing section that processes a pixel signal, wherein
a pair of pixels adjacent to each other in the pixel block share a microlens, and
the image processing section performs processing of acquiring a phase difference from respective pixel signals of the pair of pixels.

7. The solid-state imaging element according to claim 4, further comprising
an amplifier circuit that amplifies a pixel signal in at least one of the deca-pixel block or the octa-pixel block with a gain set on a basis of a ratio of charge-voltage conversion efficiency of each of the deca-pixel block and the octa-pixel block and a ratio of a number of pixels added.

8. The solid-state imaging element according to claim 1, wherein
the predetermined parameter includes at least one of an amount of motion of a subject, a shutter speed, or a frame rate.

9. The solid-state imaging element according to claim 1, wherein the predetermined parameter includes international organization for standardization (ISO) sensitivity.

10. An imaging device comprising:
a drive section that causes each of first pixels and each of second pixels to be exposed over different exposure times in a case where a predetermined exposure ratio mode is set, and makes a value of a sensitivity of a third pixel different from a value of a sensitivity of a fourth pixel by pixel addition in a case where a predetermined pixel addition ratio mode is set;
a mode setting section that sets one of the predetermined pixel addition ratio mode and the predetermined exposure ratio mode on a basis of a predetermined parameter related to an imaging scene; and
a signal processing section that processes image data read from the drive section.

11. A method for controlling a solid-state imaging element, the method comprising:
a drive step of causing each of first pixels and each of second pixels to be exposed over different exposure times in a case where a predetermined exposure ratio mode is set, and making a value of a sensitivity of a third pixel different from a value of a sensitivity of a fourth pixel by pixel addition in a case where a predetermined pixel addition ratio mode is set; and
a mode setting step of setting one of the predetermined pixel addition ratio mode and the predetermined exposure ratio mode on a basis of a predetermined parameter related to an imaging scene.

* * * * *